(12) United States Patent
Small et al.

(10) Patent No.: US 8,743,740 B2
(45) Date of Patent: Jun. 3, 2014

(54) METHODS AND APPARATUS TO IMPLEMENT A PARTIAL MESH VIRTUAL PRIVATE LOCAL AREA NETWORK SERVICE

(75) Inventors: David Small, Dublin, CA (US); Thomas Spencer, Morganville, NJ (US); Canhui Ou, Berkeley, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 61 days.

(21) Appl. No.: 12/099,553

(22) Filed: Apr. 8, 2008

(65) Prior Publication Data

US 2009/0252061 A1 Oct. 8, 2009

(51) Int. Cl.
*H04L 12/28* (2006.01)

(52) U.S. Cl.
USPC .......................................... 370/255; 370/389

(58) Field of Classification Search
None
See application file for complete search history.

(56) References Cited

U.S. PATENT DOCUMENTS

| | | | |
|---|---|---|---|
| 5,495,479 A | 2/1996 | Galaand et al. | |
| 6,167,051 A * | 12/2000 | Nagami et al. | 370/397 |
| 6,272,135 B1 * | 8/2001 | Nakatsugawa | 370/390 |
| 6,339,595 B1 | 1/2002 | Rekhter et al. | |
| 6,526,056 B1 | 2/2003 | Rekhter et al. | |
| 6,633,565 B1 * | 10/2003 | Bronstein et al. | 370/392 |
| 6,778,498 B2 | 8/2004 | McDysan | |
| 6,789,121 B2 | 9/2004 | Lamberton et al. | |
| 7,009,983 B2 | 3/2006 | Mancour | |
| 7,069,336 B2 | 6/2006 | Mangan | |
| 7,154,889 B1 | 12/2006 | Rekhter et al. | |
| 7,185,107 B1 | 2/2007 | Cassar | |
| 7,260,097 B2 | 8/2007 | Casey | |
| 7,408,941 B2 * | 8/2008 | Martini et al. | 370/395.53 |
| 7,653,019 B2 * | 1/2010 | Gaast et al. | 370/312 |
| 7,787,396 B1 * | 8/2010 | Nalawade et al. | 370/254 |
| 8,155,008 B2 * | 4/2012 | Jetcheva et al. | 370/238 |
| 2002/0110087 A1 * | 8/2002 | Zelig et al. | 370/236 |
| 2004/0208122 A1 | 10/2004 | McDysan | |
| 2005/0089047 A1 | 4/2005 | Ould-Brahim et al. | |
| 2005/0105524 A1 | 5/2005 | Stevens et al. | |
| 2005/0169270 A1 * | 8/2005 | Mutou et al. | 370/390 |
| 2005/0213513 A1 | 9/2005 | Ngo et al. | |
| 2005/0265308 A1 | 12/2005 | Barbir et al. | |
| 2006/0002401 A1 * | 1/2006 | Mukherjee et al. | 370/401 |
| 2006/0029032 A1 * | 2/2006 | Allan et al. | 370/351 |

(Continued)

OTHER PUBLICATIONS

Pullman, N.J., "Clique Coverings of Graphs V: Maximal-Clique Partitions", 1982, Bull. Austral. Math. Soc., vol. 25, pp. 337-356.*

(Continued)

*Primary Examiner* — Gregory Sefcheck
*Assistant Examiner* — Steve Young
(74) *Attorney, Agent, or Firm* — Hanley, Flight & Zimmerman, LLC

(57) ABSTRACT

Methods and apparatus to implement a partial mesh virtual private local area network service are disclosed. An example method to implement a partial mesh virtual private local area network service (VPLS) network disclosed herein comprises identifying a desired partial mesh topology of connections for interconnecting a plurality of provider edge devices comprising the VPLS network, and decomposing the partial mesh topology into a plurality of cliques, wherein each clique comprises a respective full mesh topology of connections for interconnecting a respective subset of the plurality of provider edge devices, and wherein a union of the plurality of cliques implements the desired partial mesh topology.

16 Claims, 12 Drawing Sheets

(56) References Cited

U.S. PATENT DOCUMENTS

| | | | |
|---|---|---|---|
| 2006/0182122 | A1 | 8/2006 | Davie et al. |
| 2006/0187855 | A1* | 8/2006 | Booth et al. ............... 370/254 |
| 2006/0215578 | A1 | 9/2006 | Andrapalliyal et al. |
| 2006/0227723 | A1 | 10/2006 | Vasseur et al. |
| 2007/0008982 | A1 | 1/2007 | Voit et al. |
| 2007/0097974 | A1 | 5/2007 | Ward et al. |
| 2007/0097991 | A1* | 5/2007 | Tatman ................. 370/395.53 |
| 2007/0115985 | A1 | 5/2007 | Choudhury et al. |
| 2007/0121486 | A1 | 5/2007 | Guichard et al. |
| 2007/0133406 | A1 | 6/2007 | Vasseur |
| 2007/0140250 | A1 | 6/2007 | McAllister et al. |
| 2007/0217419 | A1 | 9/2007 | Vasseur |
| 2008/0259815 | A1* | 10/2008 | Gorman .................... 370/254 |

OTHER PUBLICATIONS

Jennings, Esther, "Lecture Notes in Computer Science: A Distributed Algorithm for finding All Maximal Cliques in a Network Graph", 1992, Springer Berlin/Heidelberg, vol. 583/1992, 281-288.*

Regin, Jean-Charles, "Lecture Notes in Computer Science: Using Constraint Programming to Solve the Maximum Clique Problem", 2003, Springer-Verlag Berlin/Heidelberg, pp. 634-648.*

McGuinness, Sean, "Greedy Clique Decompositions and the Turan Numbers", 1994, University of Umea, pp. 1-13.*

Bates et al., Internet RFC, RFC No. 4456, BGP Route Reflection: An Alternative to Full Mesh Internal BGP (IBGP), Apr. 2006, 12 pages.

Kompella et al., Internet RFC, RFC No. 4761, "Virtual Private LAN Service (VPLS) Using BGP for Auto-Discovery and Signaling", Jan. 2007, 28 pages.

Lasserre et al., Internet RFC, RFC No. 4762, "Virtual Private LAN Service (VPLS) Using Label Distribution Protocol (LDP) Signaling", Jan. 2007, 31 pages.

\* cited by examiner

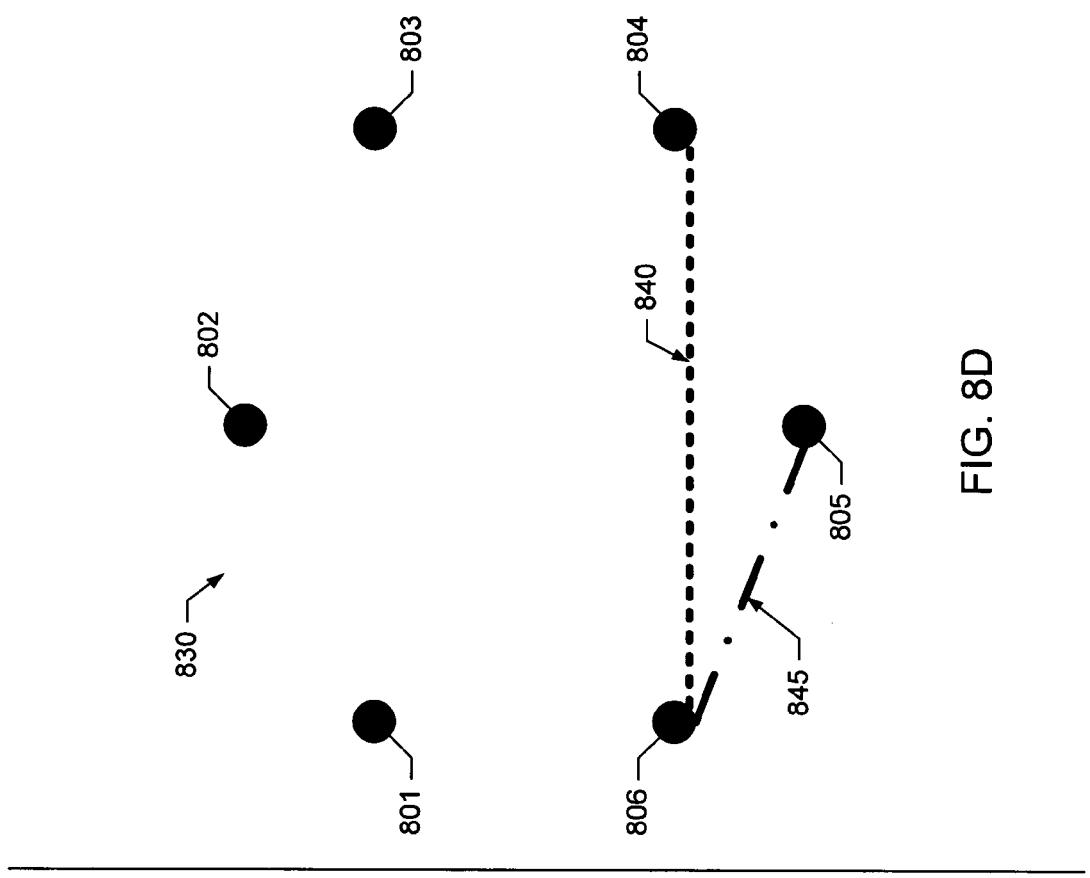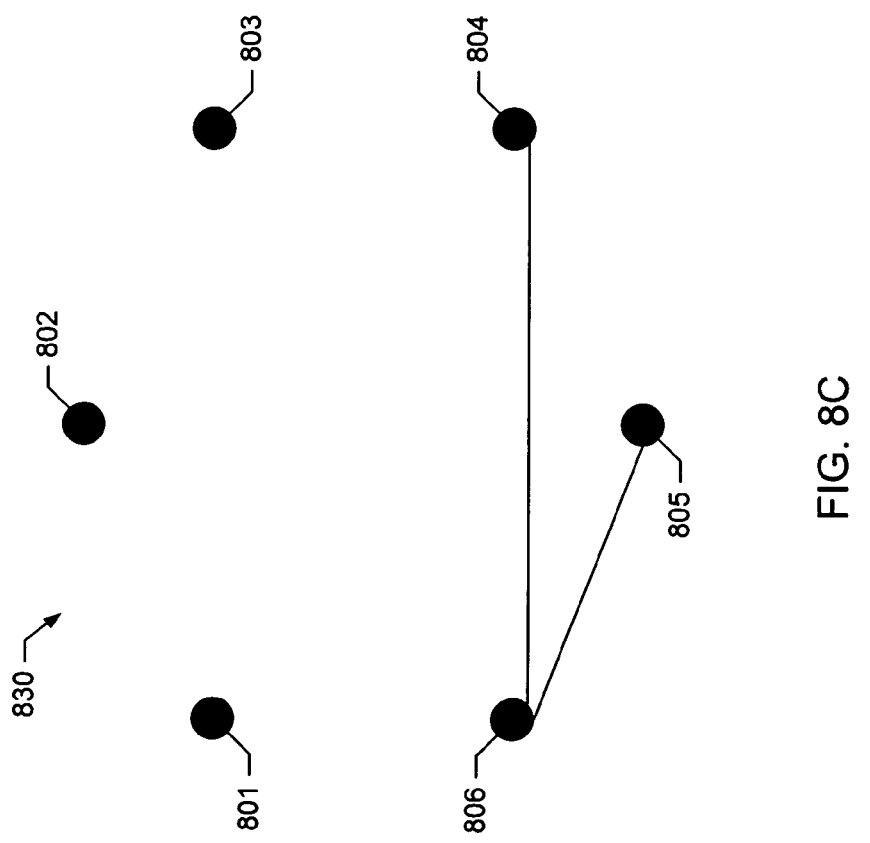

METHODS AND APPARATUS TO IMPLEMENT A PARTIAL MESH VIRTUAL PRIVATE LOCAL AREA NETWORK SERVICE

FIELD OF THE DISCLOSURE

This disclosure relates generally to communication networks and, more particularly, to methods and apparatus to implement a partial mesh virtual private local area network service.

BACKGROUND

Today's network providers offer many private network solutions to their customers. One such private network solution is a virtual private local area network service (VPLS). A VPLS network interconnects multiple customer sites such that the customer sites appear (at least from the customer's perspective) to be operating on the same local area network (LAN). A typical VPLS network includes a group of provider devices, such as a group of provider edge (PE) devices, forming the switching infrastructure of the VPLS network. Each customer site includes a corresponding customer edge (CE) device (e.g., such as a router, switch, etc.) to couple with a respective PE device to interconnect the customer site with the VPLS infrastructure. Data packets may then be exchanged between multiple sites via the CE and PE devices as if the multiple sites were operating on the same LAN.

Implementation of the VPLS infrastructure usually involves forming a full mesh of infrastructure signaling connections, known as "outer tunnels," between the PE devices. Each actual Virtual Private Network (VPN) supported by the VPLS infrastructure is then implemented using a respective full mesh of VPLS traffic connections, known as "inner tunnels" or "pseudowires," formed between the PE devices using the full mesh of outer tunnels. As such, in some example implementations, multiple full meshes of pseudowires may be carried by the full mesh of outer tunnels interconnecting the PE devices, thereby allowing a single VPLS infrastructure implementation to support multiple VPLS VPNs.

Conventional VPLS networks implemented according to today's industry standards require a full mesh of pseudowires between PE devices. A full mesh topology avoids the need to implement loop-breaking protocols, such as the spanning tree protocol (STP), etc., to prevent the forwarding loops that could occur if a partial mesh topology were used to provide full connectivity between all customer sites (e.g., via multi-hopping between PE devices). However, in some scenarios, the full connectivity between all customer sites provided by a full mesh topology is not required or even desired.

BRIEF DESCRIPTION OF THE DRAWINGS

FIGS. 8A-8E collectively illustrate an example operation of the example machine readable instruction of FIG. 7 to decompose the partial mesh VPLS topology illustrated in FIG. 3 into multiple full mesh cliques to implement the example partial mesh VPLS network of FIG. 4.

DETAILED DESCRIPTION

Figure 1:
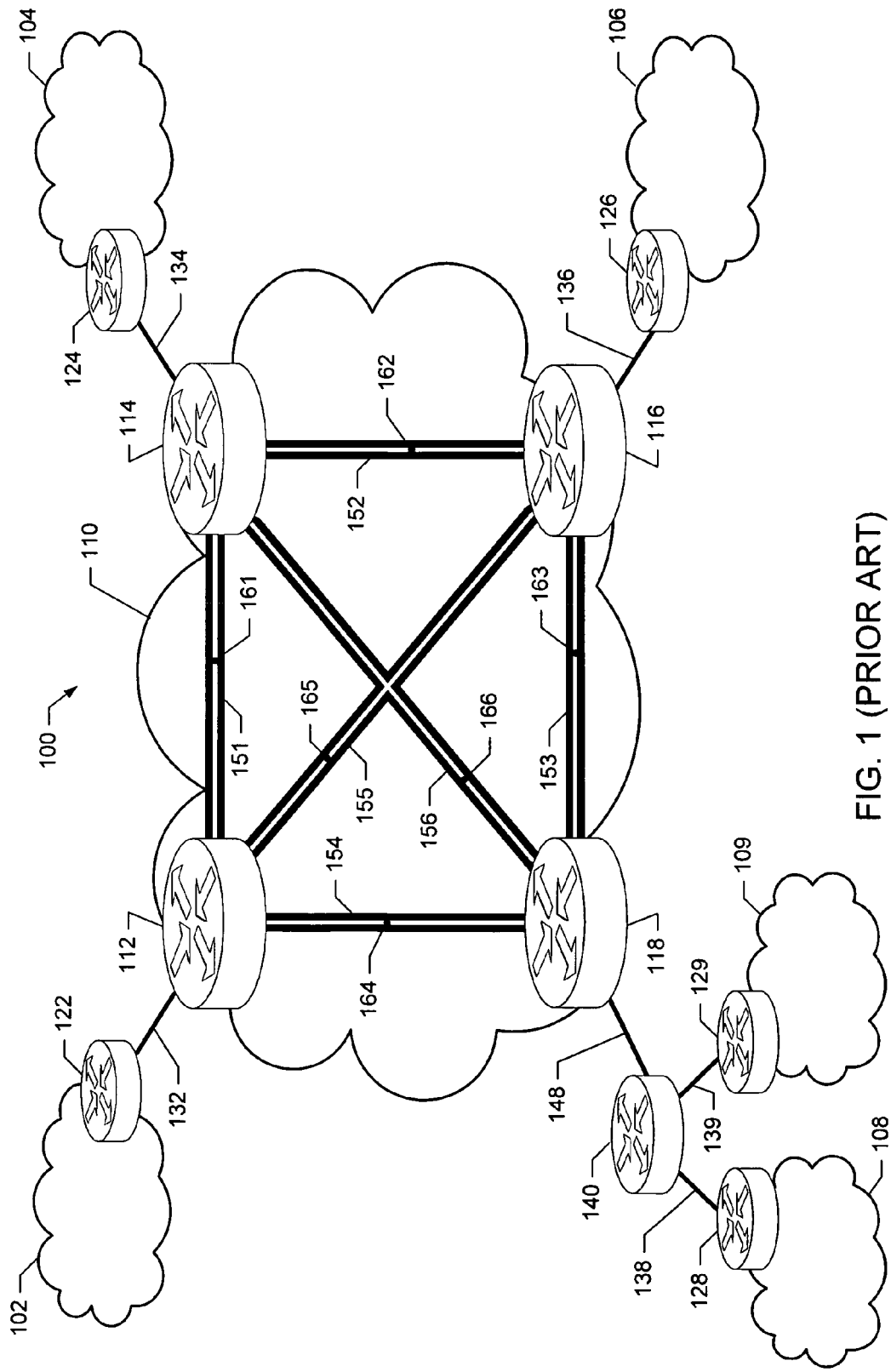
FIG. 1 is a block diagram of a first example prior art virtual private local area network service (VPLS) network implemented using a full mesh topology of pseudowires to provide full data and signaling connectivity between customer sites.
Figure 2:
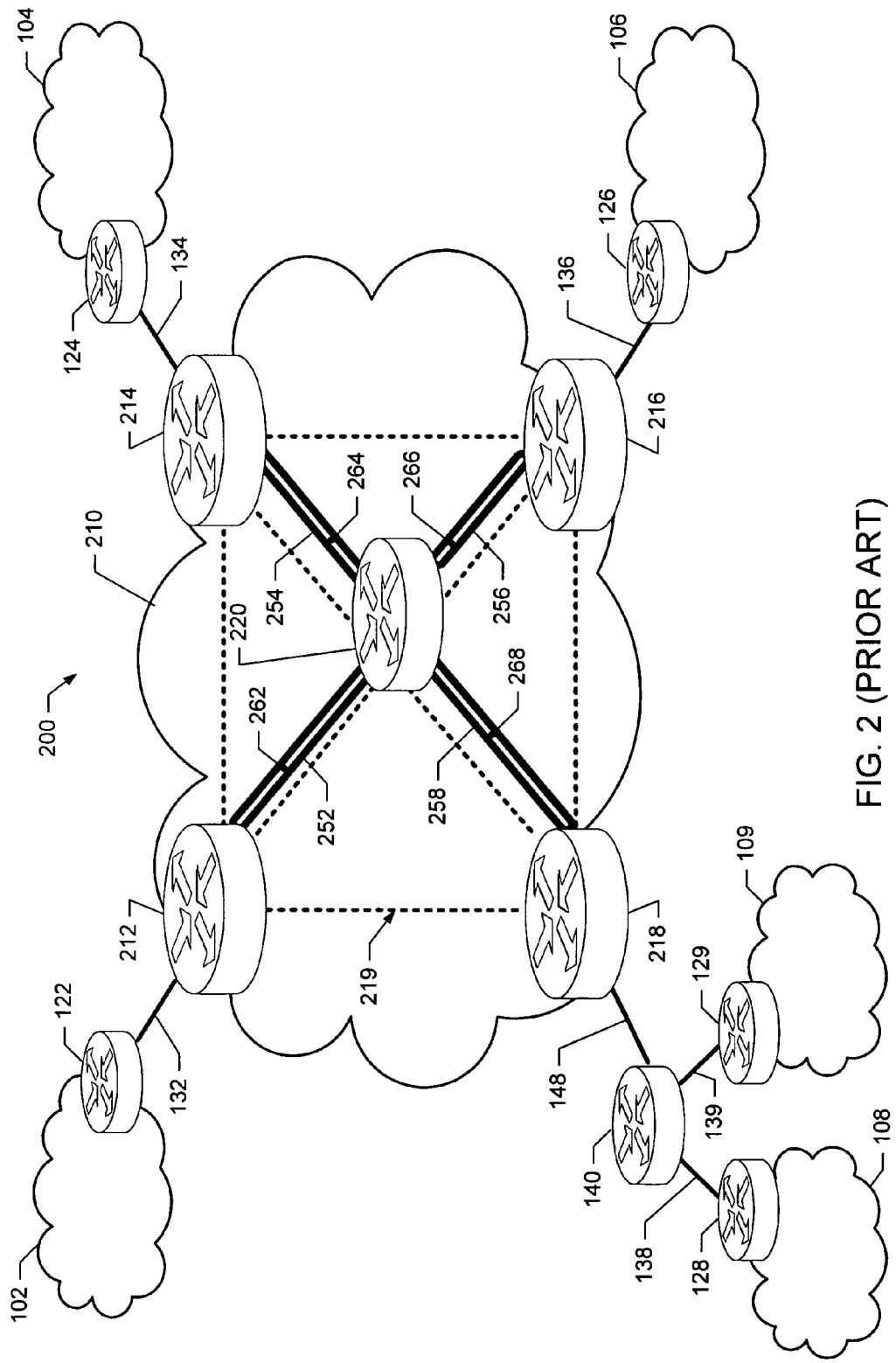
FIG. 2 is a block diagram of a second example prior art VPLS network implemented using a route reflector to provide signaling connectivity between customer sites.

To provide a context for describing the example methods and apparatus described herein to implement a partial mesh virtual private local area network service (VPLS), first and second example prior art VPLS networks 100 and 200 are illustrated in FIGS. 1 and 2, respectively. The example prior art VPLS networks 100 and 200 each provide full connectivity between a plurality of customer sites. The first example prior art VPLS network 100 provides full data and signaling connectivity through a full mesh of connections interconnecting all of the plurality of customer sites. The second example prior art VPLS network provides full data connectivity through a full mesh of interconnections, but employs a route reflector configured to advertise network signaling (e.g., such as forwarding information) to all of the plurality of customer sites, thereby providing full signaling connectivity.

Turning to FIG. 1, the first example prior art VPLS network 100 provides full connectivity to a plurality of customer sites 102, 104, 106, 108 and 109. For example, the customer sites 102-109 may include, but are not limited to, single network devices (e.g., computers, peripherals, etc.) and/or multiple network devices connected via one or more local area networks (LANs) at a particular site. The example prior art VPLS network 100 implements a VPLS switching infrastructure 110 to interconnect the plurality of customer sites 102-109 such that the customer sites appear (at least from the customer's perspective) to be operating on the same LAN. As discussed above, the VPLS switching infrastructure 110 is implemented using a plurality of provider edge (PE) devices 112, 114, 116 and 118 interconnected using a full mesh topology of connections described in greater detail below.

To interconnect the plurality of customer sites 102-109 to the VPLS switching infrastructure 110, the example prior art VPLS network 100 includes a respective plurality of customer edge (CE) devices 122, 124, 126, 128 and 129. The CE devices 122-129 may be implemented by, for example, routers, switches, etc., to route traffic between the customer sites 102-109 and the PE devices 112-118. In the illustrated example, the CE device 122 interconnects the customer site 102 to the PE device 112 via an attachment circuit (AC) 132. Similarly, the CE device 124 interconnects the customer site 104 to the PE device 114 via AC 134 and the CE device 126 interconnects the customer site 106 to the PE device 116 via an AC 136. However, for the customer sites 108 and 109, the example prior art VPLS network 100 illustrates another approach for interconnecting customer sites with the VPLS switching infrastructure 110. In the particular illustrated example, ACs 138 and 139 are used to interconnect, respectively, the CE device 128 included in the customer site 108 and the CE device 129 included in the customer site 109 to an aggregation unit (AGG) 140. The AGG 14, in turn, interconnects with the PE device 118 via an AC 148. In an example implementation, the ACs 132-139 and/or 148 may be implemented by data link layer (also known as "layer-2") connections, such as, for example, Ethernet connections. The AGG 140 may be implemented by any type of aggregation device, switch, etc., such as, for example, a multi-tenant unit (MTU) implemented according to conventional VPLS industry standards.

To implement the VPLS switching infrastructure 110, the plurality of PE devices 112-118 included in the first example prior art VPLS network 100 are interconnected by a plurality of outer tunnels 151, 152, 153, 154, 155 and 156 as shown. The plurality of outer tunnels 151-156 provide a full mesh of infrastructure signaling connections capable of supporting one or more VPLS network instances, such as the single instance illustrated in the example of FIG. 1. In an example implementation, the outer tunnels 151-156 may be implemented using multi-protocol label switching (MPLS), which is a protocol capable of carrying many different types of traffic (e.g., such a layer-2 Ethernet traffic, Internet protocol (IP) traffic, etc.) over a common network. Additionally, various protocols exist which may be used to establish and manage the outer tunnels 151-156 in an MPLS implementation. For example, the label distribution protocol (LDP) may be used to establish the outer tunnels 151-156 forming the VPLS infrastructure through distributed signaling exchanges between the PE devices 112-118. In another example, the border gateway protocol (BGP) may be used to establish the outer tunnels 151-156 forming the VPLS infrastructure through a more centralized exchange of routing information in which each of the PE devices 112-118 broadcasts a common control plane message to the other PE devices 112-118 (e.g., in the form of an update message including a label block addressed to all of the other PE devices 112-118).

Each VPLS network instance, such as the single network instance illustrated in FIG. 1, is implemented using a respective full mesh of pseudowires (e.g., VPLS traffic connections) between the PE devices 112-118 and carried by the full mesh of outer tunnels 151-156. For example, a plurality of pseudowires 161, 162, 163, 164, 165 and 166, which are carried by the respective outer tunnels 151, 152, 153, 154, 155 and 156, provide a full mesh of VPLS traffic connections supporting the single VPLS network instance depicted in FIG. 1. Furthermore, in the illustrated example implementation, LDP is used to establish the pseudowires 161-166 carrying the traffic corresponding to the particular VPLS instance interconnecting the customer sites 102-109. As such, the first example prior art VPLS network 100 is referred to as a VPLS-LDP network. In the example VPLS-LDP implementation, individual LDP signaling sessions are established between each pair of adjacent PE devices to exchange routing information for establishing the pseudowire between the adjacent PE devices (e.g., such as a VPLS identifier used to identify the particular VPLS instance associated with the established pseudowire, identifiers for addressing the adjacent PE devices in the particular VPLS instance, etc.). Then, the pseudowires 161-166 may carry traffic corresponding to a particular VPLS instance through use of a VPLS demultiplexor label providing network protocol (e.g., Ethernet) forwarding information for each data packet. A demultiplexor label is an MPLS label identifying the originating (i.e., ingress) PE device associated with the packet and the VPLS instance to which the data packet belongs.

A full mesh topology of pseudowires 161-166 is implemented in the first example prior art VPLS network 100 to provide full connectivity between the PE devices 112-118 (and, thus, the CE devices 122-129 coupled thereto). As discussed above, such a full mesh topology avoids the need to implement loop-breaking protocols, such as the spanning tree protocol (STP), etc., to prevent the forwarding loops that could occur if a partial mesh topology were used to provide the full connectivity between the PE devices 112-118 (e.g., via multi-hopping). Instead, to avoid forwarding loops, a typical full mesh implementation, such as the illustrated example of FIG. 1, employs a "split horizon" rule for media access control (MAC) address learning and packet flooding.

MAC address learning is performed by a PE device (e.g., such as the PE devices 112-118), when a data packet arrives at the PE device and includes an unknown destination address. Through MAC address learning, the PE device ultimately learns the destination PE device associated with the presently unknown destination address and stores this forwarding information (or, more generally, routing information) in the PE device's forwarding information base (FIB). Then, when subsequent data packets arrive at the PE device and include this destination address, the PE device can forward the packet directly to the destination PE device based on the forwarding information stored in the FIB. To manage the entries of the FIB, especially in the case of managing addresses for mobile destination network devices, a MAC aging algorithm may be used to delete FIB entries after a certain period of inactivity.

To initiate MAC learning, a data packet arriving at the PE and having an unknown destination address is broadcast (i.e., "flooded") to all other PE devices implementing the VPLS network instance corresponding to the incoming data packet. For example, if the PE device 112 receives an incoming data packet from the CE device 122 having an unknown destination address, the PE device 112 will flood the data packet to the other PE devices 114-118. One of the PE devices 114-118 receiving the flooded data packet will be coupled to the customer site including the network device associated with the unknown destination address. For example, assume that the destination address in this example is associated with a network device included in the customer site 106, which is coupled to the PE device 116 via the CE device 126. The PE device 116 will then receive a flooded data packet from the PE device 112 and forward the packet to the appropriate destination device in the customer site 106. Additionally, the PE device 116 will update its FIB to include forwarding information associating the PE device 112 with the origination address included in the received data packet.

To complete MAC learning, the network device included in the customer site 106 generates a reply to the received data packet. Based on the forwarding information stored in its FIB, the PE device 116 knows to forward the reply packet directly to the PE device 112. The PE device 112 receives this response and associates it with the original data packet having the unknown destination address. The PE device 112 is then able to associate the PE device 116 with this previously unknown destination address because the PE device 116 was the source of the response. Based on this association, the PE device 112 will update its FIB to include forwarding information associating the PE device 116 with the previously unknown destination address. The PE device 112 can then use this forwarding information to send future packets destined for this particular destination address directly to the PE device 116.

The split horizon rule prevents routing loops from occurring in the full mesh topology interconnecting PE devices (e.g., such as the full mesh topology of pseudowires 161-166 interconnecting the PE devices 112-118) by limiting the direction in which packet flooding may occur. In particular, the split horizon rule allows a PE device (e.g., such as the PE device 112) to flood an incoming data packet received from an associated CE device (e.g., such as the CE device 122) to all other PE devices included in the particular VPLS instance (e.g., such as the PE devices 114-118). However, under the split horizon rule, a PE device (e.g., such as the PE device 112) is prohibited from flooding a data packet received from another PE device (e.g., such as one of the PE devices 114-118) to the other PE devices. In this way, a packet received from a PE device (or, more generally, the VPLS switching infrastructure) cannot be routed between multiple PE devices and potentially result in a forwarding loop.

As mentioned above, the second example prior art VPLS network 200 illustrated in FIG. 2 is also capable of providing full connectivity to the plurality of customer sites 102, 104, 106, 108 and 109. The second example prior art VPLS network 200 of FIG. 2 includes many elements in common with the first example prior art VPLS network 100 of FIG. 1. As such, like elements in FIGS. 1 and 2 are labeled with the same reference numerals. For brevity, the detailed descriptions of these like elements are provided above in connection with the discussion of FIG. 1 and, therefore, are not repeated in the discussion of FIG. 2.

Turning to FIG. 2, the second example prior art VPLS network 200 includes the plurality of customer sites 102, 104, 106, 108 and 109, the corresponding plurality of CE devices 122, 124, 126, 128, and 129, the corresponding plurality of ACs 132, 134, 136, 138 and 139, the AGG 140 and the AC 148 described above in connection with FIG. 1. The second example prior art VPLS network 200 also implements a VPLS switching infrastructure 210 to interconnect the plurality of customer sites 102-109 such that the customer sites appear (at least from the customer's perspective) to be operating on the same LAN. The VPLS switching infrastructure 210 includes a plurality of PE devices 212, 214, 216 and 218 interconnected via a full mesh connection topology 219, as well as an example route reflector 220 as discussed in greater detail below.

To interconnect the plurality of customer sites 102-109 to the VPLS switching infrastructure 210 of the example prior art VPLS network 200, the CE device 122 interconnects the customer site 102 to the PE device 212 via the AC 132. Similarly, the CE device 124 interconnects the customer site 104 to the PE device 214 via the AC 134, the CE device 126 interconnects the customer site 106 to the PE device 216 via the AC 136 and the AGG 140 interconnects to the PE device 218 via the AC 148. The full mesh topology of connections 219 provides full data plane connectivity between the plurality of PE devices 212, 214, 216 and 218, similar to the full mesh topology described above in the example of FIG. 1. However, in contrast with the example of FIG. 1, the VPLS switching infrastructure 210 is implemented to provide signaling connectivity (e.g., which may be considered to be an "implicit" full mesh signaling topology) between the plurality of customer sites 102-109 by using the route reflector 220 to fully interconnect the signaling planes of the plurality of PE devices 212, 214, 216 and 218.

To implement signaling plane of the VPLS switching infrastructure 210, the plurality of PE devices 212-218 included in the second example prior art VPLS network 200 are interconnected with the route reflector 220 by a plurality of outer tunnels 252, 254, 256 and 258 as shown. The plurality of outer tunnels 252-258 provide infrastructure signaling connections capable of supporting one or more VPLS network instances, such as the single instance illustrated in the example of FIG. 2. In an example implementation, the outer tunnels 252-258 may be implemented using MPLS and established via BGP by broadcasting one or more common control plane messages carrying VPLS routing information from each PE device 212-218 that is reflected to the other PE devices 212-218 by the route reflector 220.

The signaling plane for each VPLS network instance, such as the single network instance illustrated in FIG. 2, is implemented using a respective plurality of pseudowires (e.g., VPLS traffic connections) interconnecting the PE devices 212-218 with the route reflector 220 and carried by the outer tunnels 252-258. For example, a plurality of pseudowires 262, 264, 266 and 268, which are carried by the respective outer tunnels 252, 254, 256 and 258, provide the VPLS signaling connections supporting the single VPLS network instance depicted in FIG. 2. Furthermore, in the illustrated example implementation, BGP is used to establish the pseudowires 262-268 carrying the signaling information corresponding to the particular VPLS instance interconnecting the customer sites 102-109. As such, the second example prior art VPLS network 200 is referred to as a VPLS-BGP network. In the example VPLS-BGP implementation, each pseudowire 262-268 (as well as each pseudowire implementing the full mesh connection topology 219) may be established between each respective PE device 212-218 and the route reflector 220 at substantially the same time at which the corresponding outer tunnel 252-258 (or the corresponding outer tunnel of the full mesh connection topology 219) is established. For example, the BGP common control plane message(s) broadcast by a PE device 212-218 during outer tunnel configuration may also include VPLS routing information for establishing the pseudowire between the PE device and the route reflector 220 (e.g., such as a VPLS identifier, or route distinguisher, used to identify the particular VPLS instance associated with the established pseudowire, and an identifier for addressing the PE device in the particular VPLS instance, etc.). After being established, the pseudowires 262-268 may carry signaling information corresponding to a particular VPLS instance through use of a VPLS demultiplexor label providing network protocol (e.g., Ethernet) routing information for each data packet. As discussed above, a demultiplexor label is an MPLS label identifying the originating (i.e., ingress) PE device associated with the signaling information and the VPLS instance to which the signaling information belongs.

The second example prior art VPLS network 200 also implements MAC address learning and packet flooding as described above to associate network device addresses with particular PE devices. Additionally, the second example prior art VPLS network 200 employs the split horizon rule to prevent forwarding loops and, thus, avoid the need to implement loop-breaking protocols, such as STP, etc. By reflecting incoming signaling information packets to the appropriate destination PE devices, the route reflector 220 provides signaling connectivity between the PE devices 212-218 similar to a full mesh topology. As such, during packet flooding the route reflector 200 reflects packets from a source PE device to all the other PE devices 212-218. Without the split horizon rule, such packets could continue to be reflected back to the route reflector 220, potentially resulting in forwarding loops.

Figure 3:
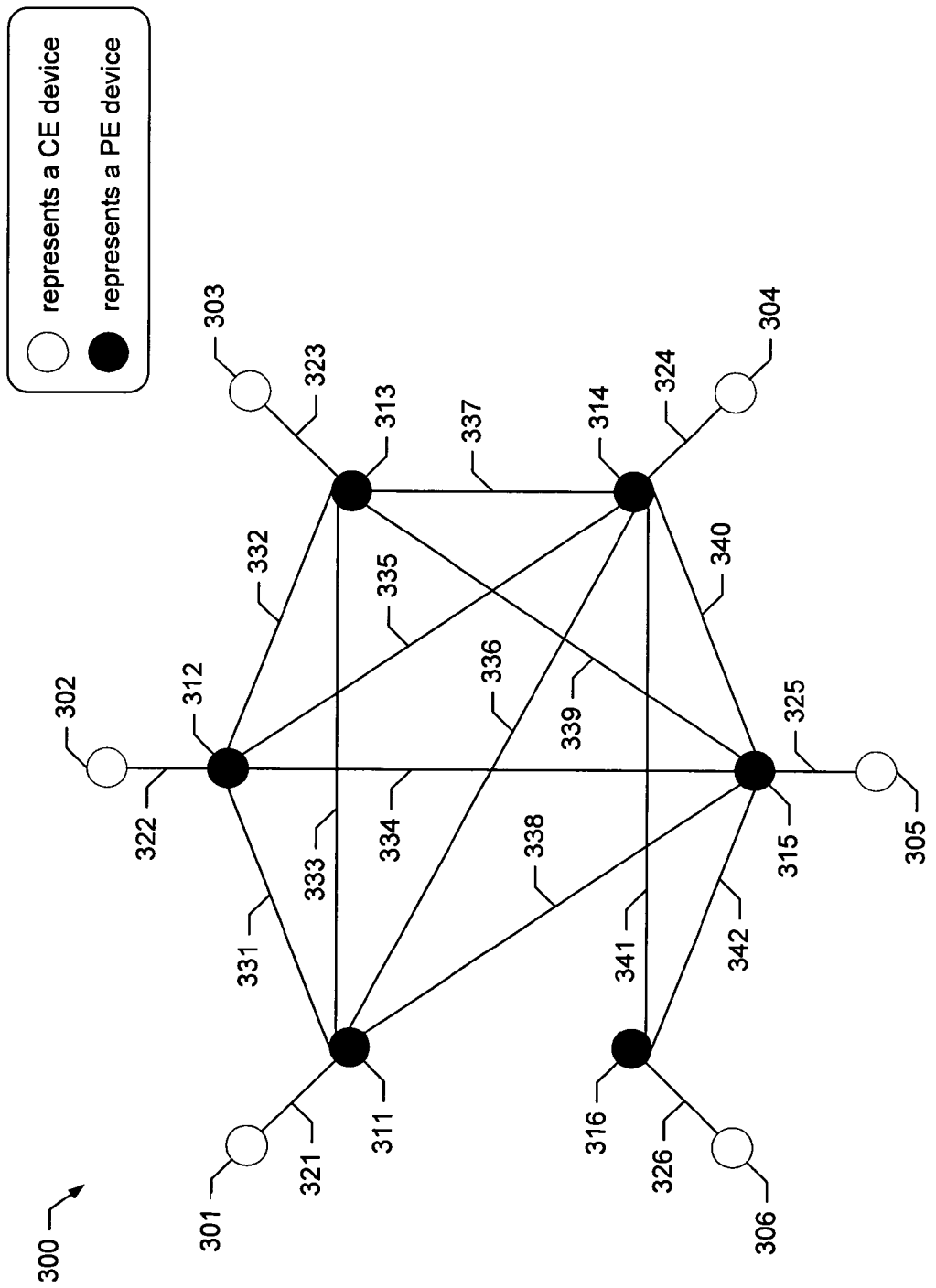
FIG. 3 is a block diagram of an example partial mesh VPLS network topology.

An example partial mesh VPLS topology 300 that may be implemented according to the methods and apparatus described herein is illustrated in FIG. 3. Unlike the full connectivity provided by the example full mesh prior art VPLS networks 100 and 200 illustrated in FIGS. 1 and 2, respectively, the example partial mesh VPLS topology 300 provides partial connectivity between a plurality of customer sites. Although the full connectivity provided by conventional VPLS networks may be appropriate in some private network applications, many customers may prefer alternative private network configurations that do not provide full connectivity between all of their respective customer sites. For example, a customer who has an alternative private network configuration based on an older networking solution may want to migrate to a VPLS solution but maintain the existing, alternative network topology. As another example, a customer may wish to explicitly restrict/prohibit network traffic exchanges between some of its customer sites for security or other reasons. A partial mesh topology implemented according to the methods and/or apparatus described herein, such as the example partial mesh VPLS topology 300, may be used to support private network solutions providing partial connectivity between customer sites within a VPLS framework.

Turning to FIG. 3, the example partial mesh VPLS topology 300 includes a plurality of CE devices 301, 302, 303, 304, 305 and 306, each configured to couple a respective customer site (not shown) to the illustrated VPLS network instance. Similar to the example prior art VPLS networks 100 and 200, the plurality of CE devices 301-306 in the example partial mesh VPLS topology 300 are coupled to a respective plurality of PE devices 311, 312, 313, 314, 315 and 316 via a respective plurality of ACs 321, 322, 323, 324, 325 and 326. As discussed above, the plurality of PE devices 311-316 implement the VPLS switching infrastructure to interconnect the plurality of CE devices 301-306 such that their respective customer sites appear (at least from the customer's perspective) to be operating on the same LAN.

To implement the particular VPLS network instance illustrated in the example of FIG. 3, the plurality of PE devices 311-316 included in the example partial mesh VPLS network topology are interconnected by a plurality of pseudowires 331, 332, 333, 334, 335, 336, 337, 338, 339, 340, 341 and 342. Each of the plurality of pseudowires 331-342 is carried by an associated outer tunnel (not shown). Because the plurality of PE devices 311-316 may support additional VPLS network instances other than the illustrated example, a full mesh topology of outer tunnels may still be used to interconnect the plurality of PE devices 311-316. However, using the methods and/or apparatus described herein, a particular VPLS instance (e.g., such as the illustrated example) may be implemented using a partial mesh of pseudowires (carried by a full mesh or partial mesh of outer tunnels).

For example, the pseudowires 311-340 implement a full mesh topology between the PE devices 311-315, thus providing full connectivity between the CE devices 301-305 (and their associated customer sites). Additionally, the pseudowire 341 provides connectivity between the PE devices 314 and 316 (by providing a "full mesh" just between those two PE devices). Similarly, the pseudowire 342 provides connectivity between the PE devices 315 and 316 (by providing a "full mesh" just between those two PE devices). However, the lack of pseudowires interconnecting the PE devices 311 and 316, the PE devices 312 and 316 and the PE devices 313 and 316, along with the split horizon rule governing VPLS traffic exchanges, restricts connectivity between these PE devices. Although the illustrated example of FIG. 3 depicts a particular partial mesh topology, any partial mesh topology could be implemented using the methods and apparatus described herein.

Figure 4:
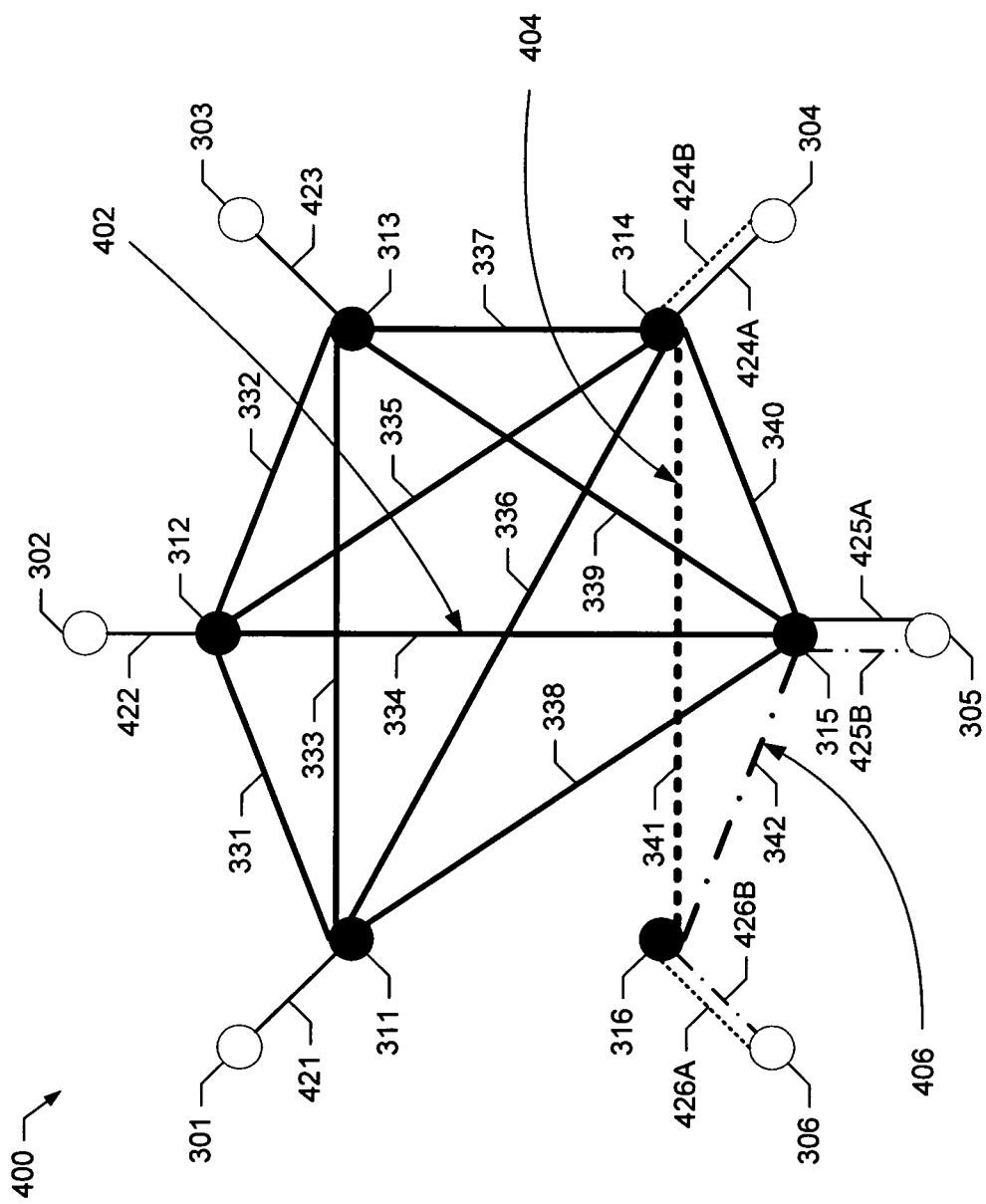
FIG. 4 is a block diagram of an example partial mesh VPLS network using multiple full mesh cliques according to the methods and apparatus described herein to implement the example partial mesh VPLS network topology of FIG. 3.

A block diagram of a first example partial mesh VPLS network 400 using the methods and apparatus described herein to implement the example partial mesh topology 300 of FIG. 3 is illustrated in FIG. 4. The first example partial mesh VPLS network 400 of FIG. 4 includes many elements in common with the example partial mesh topology 300 of FIG. 3. As such, like elements in FIGS. 3 and 4 are labeled with the same reference numerals. For brevity, the detailed descriptions of these like elements are provided above in connection with the discussion of FIG. 3 and, therefore, are not repeated in the discussion of FIG. 4.

In the illustrated example of FIG. 4, to implement the partial mesh topology 300, the first example partial mesh VPLS network 400 is formed by decomposing the desired example partial mesh topology 300 into a plurality of cliques. A clique is a full mesh topology formed using at least some of the PE devices included in a desired partial mesh topology. A union of the plurality of cliques determined from the partial mesh decomposition of the example partial mesh topology 300 is then used to implement the example partial mesh VPLS network 400. Although a VPLS-LDP implementation is illustrated in FIG. 4, the partial mesh decomposition approach, as discussed in greater detail below, is applicable to both VPLS-LDP and VPLS-BGP network implementations of the example partial mesh VPLS topology 300.

Turning to FIG. 4, the first example partial mesh VPLS network 400 includes the plurality of CE devices 301-306, the plurality of PE devices 311-316 and the plurality of pseudowires 331-342 described above in connection with FIG. 3. The pseudowires 331-342 may be established between the plurality of PE devices 311-316 via, for example, LDP as discussed above in connection with FIG. 1. In the illustrated example of FIG. 4, the partial mesh VPLS network 400 is implemented by grouping the plurality of pseudowires 331-342 into three cliques 402, 404 and 406. The first example clique 402 implements a first full mesh topology using the pseudowires 331-340 to interconnect the PE devices 311-315. The second example clique 404 implements a second full mesh topology using the pseudowire 341 to interconnect the PE devices 314-316. The third example clique 406 implements a third full mesh topology using the pseudowire 342 to interconnect the PE devices 315-316. Furthermore, none of the pseudowires 331-342 is included in the more than one of the example cliques 402-406.

As depicted in the example of FIG. 4, a union of the three example cliques 402, 404 and 406 form the VPLS switching infrastructure to interconnect all of the PE devices 311-316 according to the desired partial mesh VPLS topology 300 of FIG. 3. In an example implementation, the union of the three example cliques 402, 404 and 406 is implemented by associating each of the example cliques 402-406 with a separate VPLS instance. For example, separate VPLS identifiers may be associated with each group of pseudowires forming the respective example cliques 402-406. In other words, the first example clique 402 may be considered a first VPLS instance identified with a first VPLS identifier associated with the pseudowires 331-340. Similarly, the second example clique 404 may be considered a second VPLS instance identified with a second VPLS identifier associated with the pseudowire 341, and the third example clique 406 may be considered a third VPLS instance identified with a third VPLS identifier associated with the pseudowire 342. Each clique 402-406 then carries respective demultiplexor labels associated with only the particular clique's VPLS identifier. The combination of the three VPLS instances represented by the three example cliques 402, 404 and 406 then forms the example partial mesh VPLS network 400.

As in the previous example, ACs interconnect the CE devices 301-306 to the PE devices 311-316, and thus, to the VPLS switching infrastructure of the example partial mesh VPLS network 400. However, because a particular PE device 311-316 may be a member of more than one clique 402-406 implementing the example partial mesh VPLS network 400, multiple connections between a particular CE device 301-306 and the PE device 311-316 may be required, one for each clique represented by a separate VPLS instance. Turning to the illustrated example of FIG. 4, the CE devices 301-303 each are interconnected with the respective PE devices 301-303 using the single ACs 421, 422 and 423, respectively, because each of the PE devices 301-303 belongs to a single clique (i.e., the clique 402). In contrast, the CE device 304 is interconnected with the PE device 314 using an AC 424A associated with the first VPLS instance representative of the first clique 402 and an AC 424B associated with the second VPLS instance representative of the second clique 404. In this way, data to be transmitted from the CE device 304 to the PE device 314 will be carried on both ACs 424A and 424B, thereby allowing the data to be routed through the VPLS infrastructure by either the first clique 402 or the second clique 404 as needed to reach the appropriate destination.

Similarly, the CE device 305 is interconnected with the PE device 315 using an AC 425A associated with the first VPLS instance representative of the first clique 402 and an AC 425B associated with the third VPLS instance representative of the third clique 406. In this way, data to be transmitted from the CE device 305 to the PE device 315 will be carried on both ACs 425A and 425B, thereby allowing the data to be routed through the VPLS infrastructure by either the first clique 402 or the third clique 406 as needed to reach the appropriate destination. In a similar fashion, the CE device 306 is interconnected with the PE device 316 using an AC 426A associated with the second VPLS instance representative of the second clique 404 and an AC 426B associated with the third VPLS instance representative of the third clique 406. In this way, data to be transmitted from the CE device 306 to the PE device 316 will be carried on both ACs 426A and 426B, thereby allowing the data to be routed through the VPLS infrastructure by either the second clique 404 or the third clique 406 as needed to reach the appropriate destination.

As an alternative to interconnecting the CE devices 304-306 with the respective PE devices 314-316 using the associated separate ACs 424A-B, 425A-6 and 426A-B, the interconnections between the CE devices 304-306 and the respective PE devices 314-316 could be implemented by respective single ACs configured to carry traffic associated with multiple VPLS instances (and, thus, multiple cliques).

Figure 5:
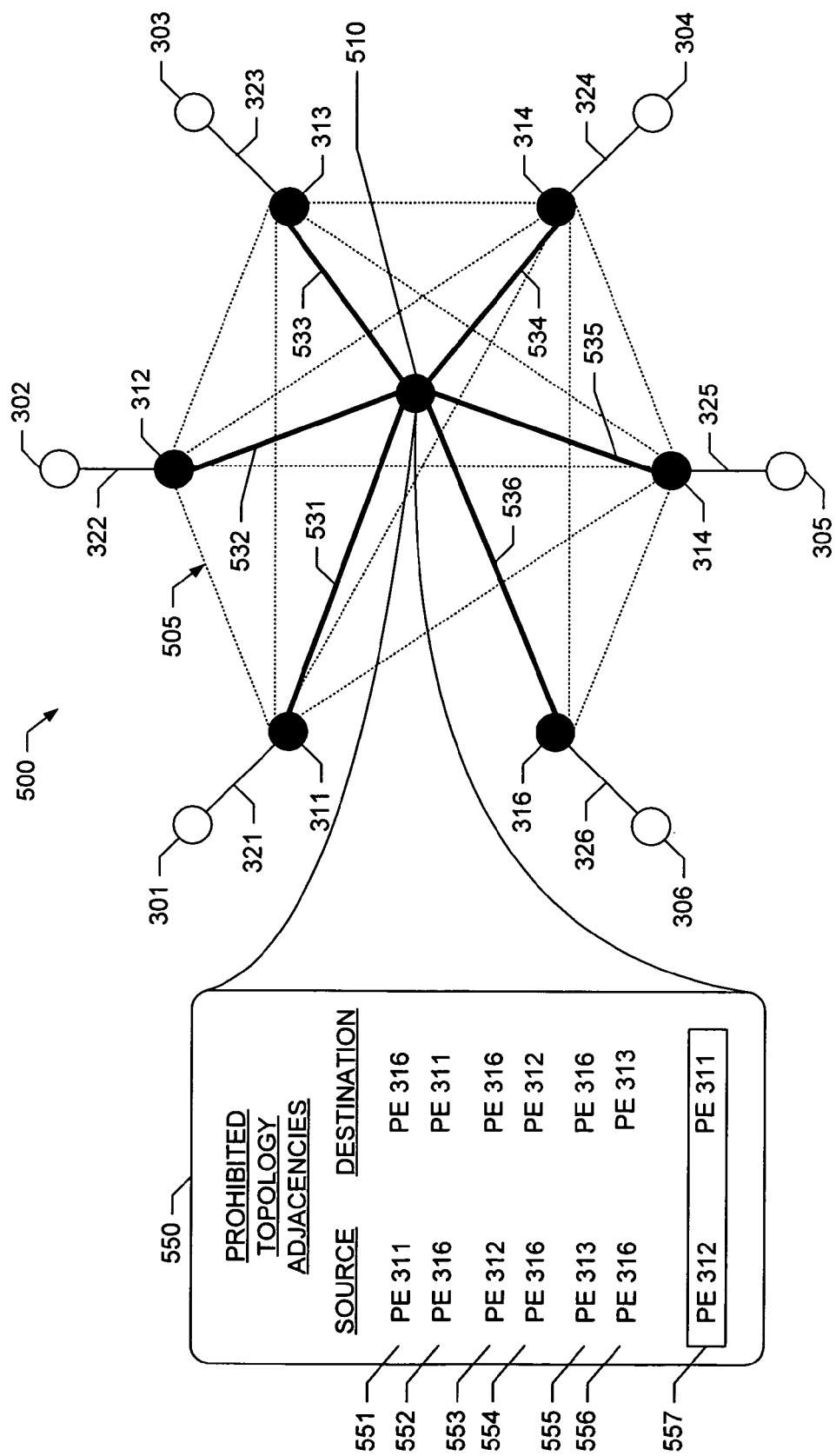
FIG. 5 is a block diagram of an example partial mesh VPLS network using route reflection according to the methods and apparatus described herein to provide signaling connectivity to implement the example partial mesh VPLS network topology of FIG. 3.

A block diagram of a second example partial mesh VPLS network 500 using the methods and apparatus described herein to implement the example partial mesh topology 300 of FIG. 3 is illustrated in FIG. 5. The second example partial mesh VPLS network 500 of FIG. 5 includes many elements in common with the example partial mesh topology 300 of FIG. 3. As such, like elements in FIGS. 3 and 5 are labeled with the same reference numerals. For brevity, the detailed descriptions of these like elements are provided above in connection with the discussion of FIG. 3 and, therefore, are not repeated in the discussion of FIG. 5.

In the illustrated example of FIG. 5, to implement the partial mesh topology 300, the second example partial mesh VPLS network 500 uses modified route reflection to restrict the exchange of signaling information between PE devices according to the desired example partial mesh topology 300. This route reflection approach to partial mesh implementation, as discussed in greater detail below, is applicable to, for example, VPLS-BGP implementations (e.g., such as the example partial mesh VPLS network 500) employing route reflectors.

Turning to FIG. 5, the second example partial mesh VPLS network 500 includes the plurality of CE devices 301-306, the plurality of PE devices 311-316 and the plurality of ACs 321-326 described above in connection with FIG. 3. In the illustrated example, the partial mesh VPLS network 500 is implemented using a partial mesh connection topology 505 to provide data plane connectivity between the plurality of PE devices 311-316. The partial mesh connection topology 505 can be implemented using of outer tunnels and pseudowires using, for example, any technique discussed above. Additionally, the partial mesh VPLS network 500 of the illustrate example employs a route reflector 510 to provide signaling plane connectivity between the plurality of PE devices 311-316 according to the desired example partial mesh topology 300 (instead of implementing the explicit mesh of pseudowire interconnections depicted in FIG. 3). To implement the signaling plane of the particular VPLS network instance illustrated in the example of FIG. 5, the plurality of PE devices 311-316 are interconnected with the route reflector 510 via a respective plurality of pseudowires 531, 532, 533, 534, 535 and 536. Each of the plurality of pseudowires 531-536 is carried by an associated outer tunnel (not shown). The pseudowires 531-536 may be established between the plurality of PE devices 311-316 and the route reflector 510 via, for example, BGP as discussed above in connection with FIG. 2.

Rather than implementing route reflection to provide full connectivity between the PE devices 311-316 as in a conventional VPLS-BGP implementation, the example route reflector 510 is configured to restrict the routing/reflection of signaling information to achieve a desired partial connectivity between the PE devices 311-316. In the particular illustrated example, the route reflector 510 implements the desired partial connectivity represented by the example partial mesh topology 300 of FIG. 3 by prohibiting signaling information (and, thus, data traffic) from being routed/reflected between the PE devices 311-316 that are not interconnected in the example partial mesh topology 300. In the illustrated example implementation, the route reflector 510 maintains a prohibited topology adjacency table 550 representing pairs of PE devices which are not interconnected in the desired example partial mesh topology 300 and, thus, are prohibited from being considered adjacent in the network topology. The prohibited topology adjacency table 550 may be used by the example route reflector 510 to filter incoming signaling packets (e.g., by referencing demultiplexor labels) to allow the signaling information to be routed only to allowed adjacent PE devices according to the desired example partial mesh topology 300.

An example prohibited topology adjacency table 550 is shown in FIG. 5 and may be implemented by, for example, one or more look-up tables, data bases, matrices, linked lists, etc. The example prohibited topology adjacency table 550 of FIG. 5 includes a plurality of entries 551-557 describing pairs of PE devices that are prohibited from being adjacent in the example partial mesh VPLS network 500. Each entry 551-557 specifies a source PE device and a destination PE device. Signaling information is prohibited from being routed from the specified source to the specified destination. In the illustrated example, the entries 551-556 specify the prohibited topology adjacencies to implement the desired example partial mesh topology 300 of FIG. 3.

For example, and referring also to FIG. 3, the entries 551-552 indicate that there is no connection between the PE devices 311 and 316. Similarly, the entries 553-554 indicate that there is no connection between the PE devices 312 and 316, and the entries 555-556 indicate that there is no connection between the PE devices 313 and 316. The example route reflector 510 uses the entries 551-556 to implement the desired example partial mesh topology 300 by filtering incoming network packets using their respective demultiplexor labels to identify their source and destination PE devices. The example route reflector 510 uses this information to prohibit (i.e., block) signaling information (and, thus, data traffic as well) from being routed between the source and destination PE devices specified by the entries 551-556 of the example prohibited topology adjacency table 550. More generally, the example prohibited topology adjacency table 550 allows the route reflector 510 to prevent signaling information originating in one PE device from being advertised to certain other PE devices according to the entries 551-556. Additionally, the split horizon rule governing VPLS traffic exchanges described above prevents the occurrence of any potential forwarding loops or data packet reflections by the PE devices 311-316 contrary to the desired example partial mesh topology 300 specified by the entries 551-556 of the example prohibited topology adjacency table 550.

Because each entry of the example prohibited topology adjacency table 550 specifies a prohibited adjacency in one direction (i.e., a unidirectional prohibited adjacency), other alternative network topologies prohibiting traffic flow in only one direction are also possible. For example, the entry 557 included in the example prohibited topology adjacency table 550 specifies a prohibited adjacency from the source PE device 312 to the destination PE device 311. However, there is no matching entry prohibiting an adjacency from the source PE device 311 to the destination PE device 312. Therefore, the route reflector 510 included in the example partial mesh VPLS network 500 is further able to restrict data from being sent from the PE device 312 to the PE device 311, while allowing data to be sent in the reverse direction from the PE device 311 to the PE device 312. Such an example is but one possible alternative network topology that could be implemented based on the route reflector 510 and the prohibited topology adjacency table 550 included in the example partial mesh VPLS network 500.

Figure 6:
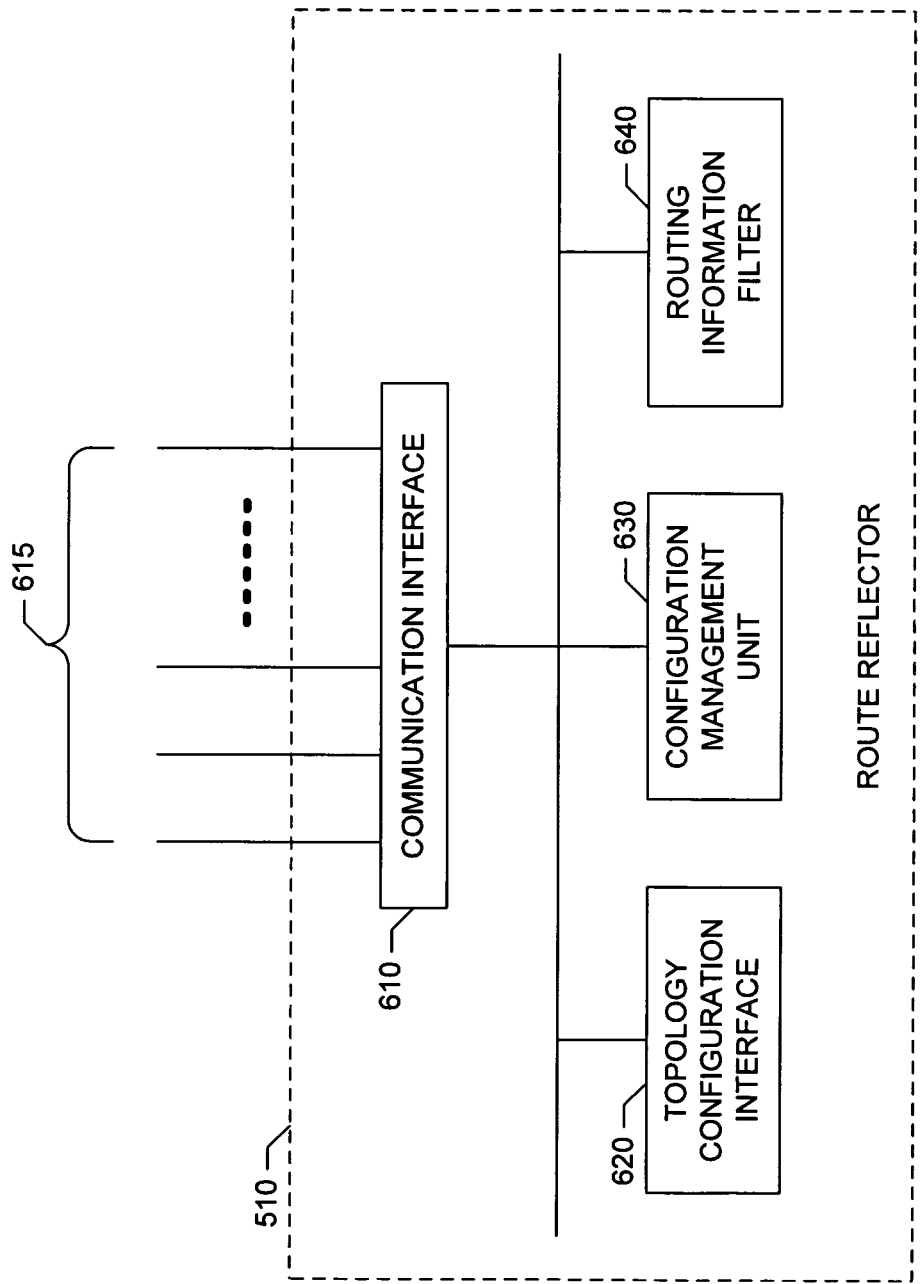
FIG. 6 is a block diagram of an example route reflector that may be used to implement the example partial mesh VPLS network illustrated in FIG. 5.

A more detailed block diagram of an example implementation of the example route reflector 510 of FIG. 5 is illustrated in FIG. 6. The example route reflector 510 of FIG. 5 includes a communication interface 610 to implement one or more pseudowires 615 for interconnecting with one or more PE devices (e.g., such as the PE devices 311-316 of FIG. 5) implementing a particular VPLS instance (e.g., such as the example partial mesh VPLS network 500). For example, the communication interface 610 may establish and maintain the pseudowire(s) 615 using BGP as discussed above.

The example route reflector 510 also includes a topology configuration interface 620 for configuring one or more partial (or full) mesh topologies corresponding to a respective one or more VPLS network instances supported by the route reflector 510. In an example implementation, the topology configuration interface 620 provides an interface (e.g., such as a graphical user interface (GUI)) to allow a network operator to specify the PE devices (e.g., such as the PE devices 311-316) implementing a particular VPLS instance and a desired topology of connections (e.g., partial or full mesh, such as the example partial mesh topology 300 of FIG. 3) interconnecting the PE devices in the particular VPLS instance.

The topology configuration information obtained by the topology configuration interface 620 is used by a configuration management unit 630 to represent the obtained network topology (e.g., partial or full mesh) in a form suitable for processing by the example route reflector 510. In an example implementation, the configuration management unit 630 accepts the topology configuration information obtained through the topology configuration interface 620 and creates a topology adjacency table specifying the adjacent PE devices between which data may be routed. For example, the topology adjacency table may be a prohibited topology adjacency table, such as the prohibited topology adjacency table 550, describing pairs of PE devices which are not adjacent in the specified topology and, thus, between which data may not be routed. In an alternative example, the topology adjacency table may be an allowed topology adjacency table describing pairs of PE devices which are adjacent in the specified topology and, thus, between which data may be exchanged.

To process incoming signaling packets and reflect/advertise them according to the topology specified by the configuration management unit 630, the example route reflector 510 includes a routing information filter 640. In an example implementation, the routing information filter 640 filters (e.g., parses) incoming signaling packets (e.g., such as demultiplexor labels) to obtain the routing information included in the signaling packets. The routing information filter 640 then compares the filtered (e.g., parsed) routing information with the topology information specified in the topology adjacency table(s) maintained by the configuration management unit 630. If the comparison indicates that a data packet has a destination PE device and a source PE device, as identified by the routing information, that are adjacent in the topology, the routing information filter 640 allows the example route reflector 510 to route/advertise the incoming signaling packet to the appropriate destination. However, if the comparison indicates that the source and destination PE devices identified by the routing information are not adjacent in the topology, the routing information filter 640 prohibits the example route reflector 510 from routing/advertising the incoming signaling packet to the identified destination. Additionally, the routing information filter 640 may cause the example route reflector 510 to respond to the identified source PE device with an appropriate error message.

Figure 7:
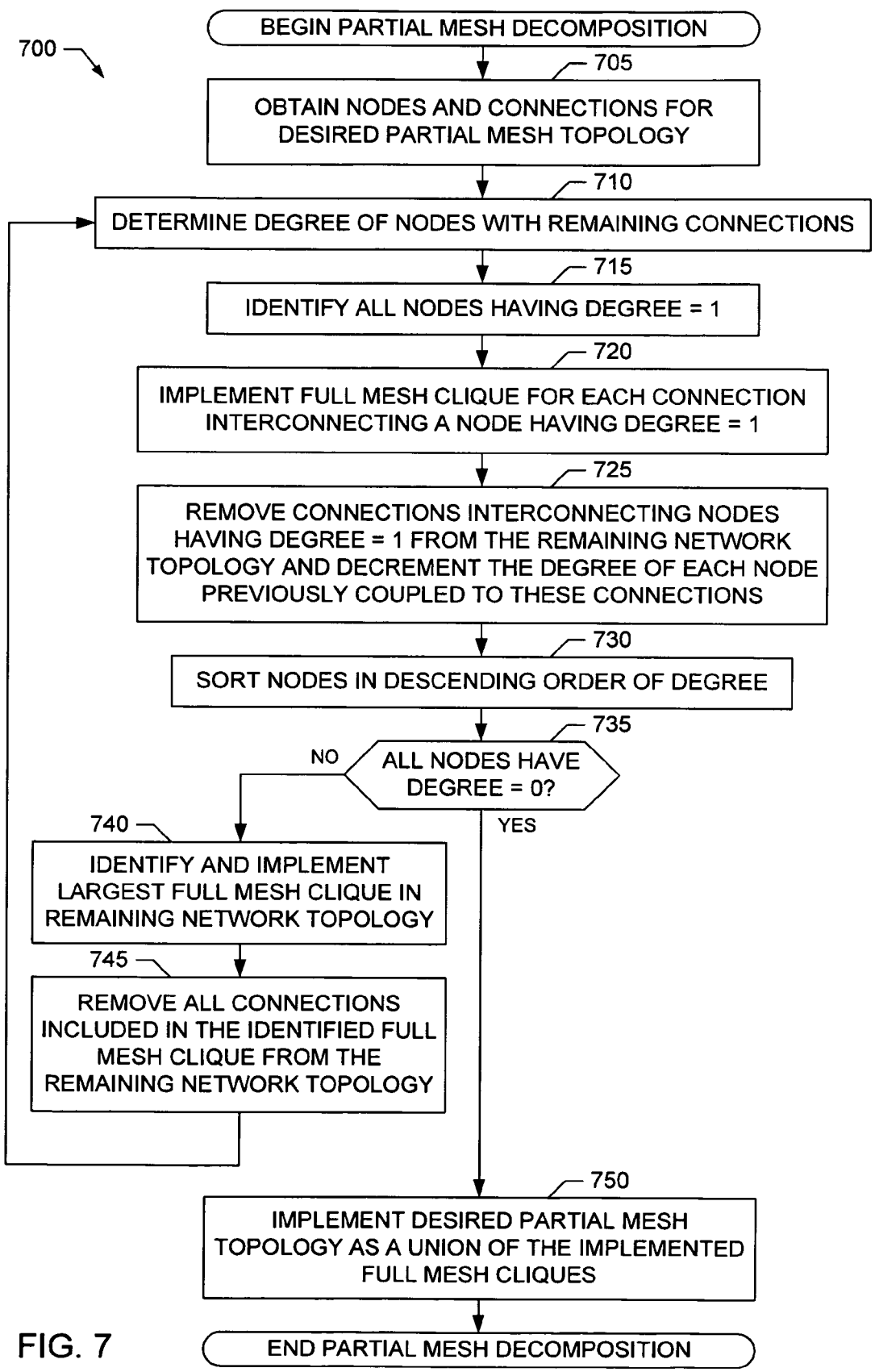
FIG. 7 is a flowchart representative of example machine readable instructions for performing partial mesh decomposition that may be executed to implement the partial mesh VPLS network illustrated in FIG. 4 by decomposing the example desired partial mesh topology of FIG. 3 into multiple full mesh cliques.
Figure 9:
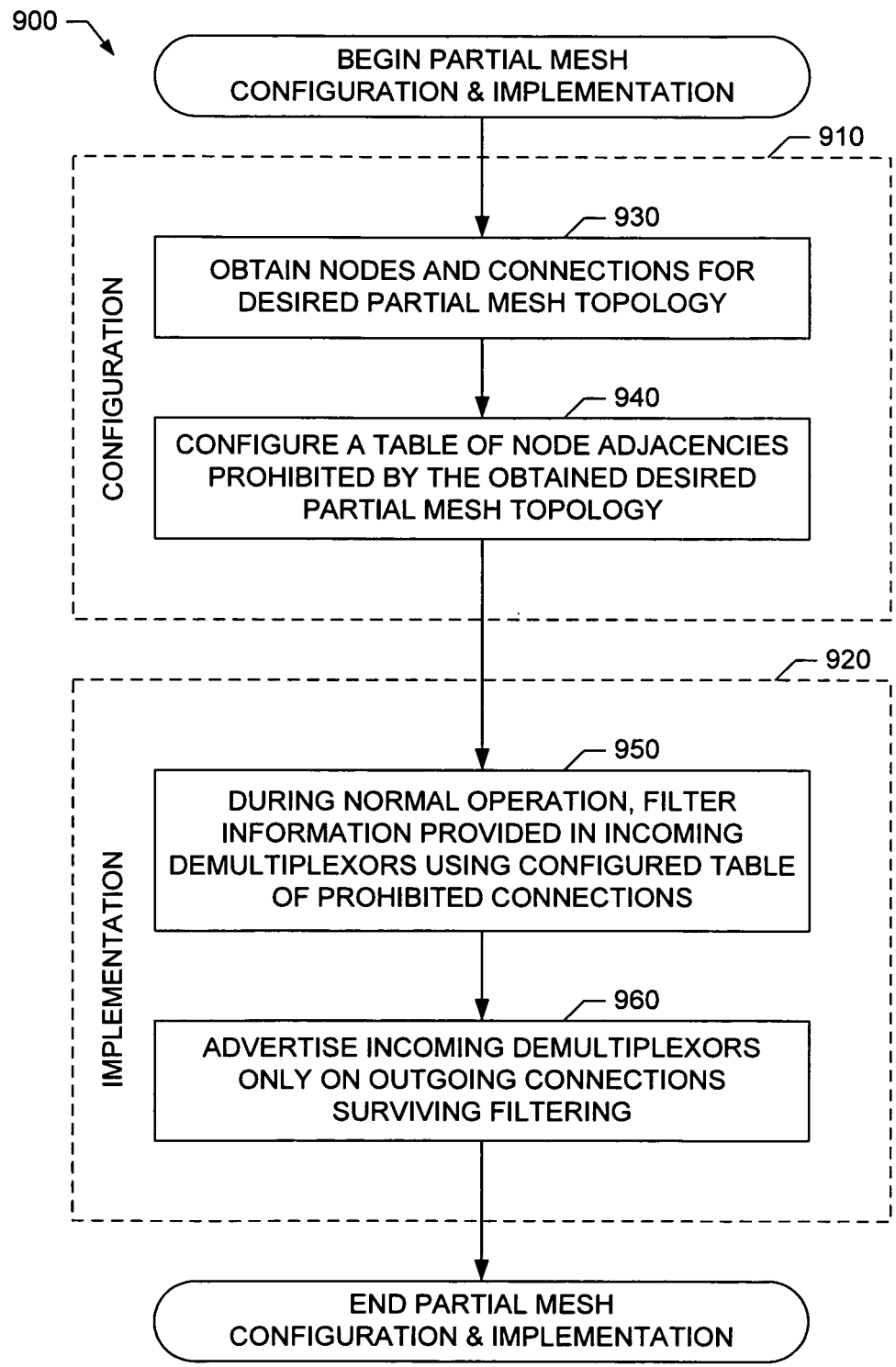
FIG. 9 is a flowchart representative of example machine readable instructions for performing partial mesh configuration and implementation that may be executed to implement the partial mesh VPLS network illustrated in FIG. 5 by using route reflection to implement the example desired partial mesh topology of FIG. 3.

Flowcharts representative of example machine readable instructions that may be executed to implement any, all, or portion(s) of the example partial mesh VPLS topology 300, the example CE devices 301-306, the example PE devices 311-316, the example ACs 321-326, the example pseudowires 331-342, the first example partial mesh VPLS network 400, the example cliques 402-406, the example ACs 421-423, 424A-B, 425A-B, 426A-B, the second example partial mesh VPLS network 500, the example route reflector 510, the example pseudowires 531-536, the example communication interface 610, the example pseudowires 615, the example topology configuration interface 620, the example configuration management unit 630 and/or the example routing information filter 640 are shown in FIGS. 7 and 9. In these examples, the machine readable instructions represented by each flowchart may comprise one or more programs for execution by: (a) a processor, such as the processor 1012 shown in the example computer 1000 discussed below in connection with FIG. 10, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1012, but the entire program or programs and/or portions thereof could alternatively be executed by a device other than the processor 1012 and/or embodied in firmware or dedicated hardware (e.g., implemented by an application specific integrated circuit (ASIC), a programmable logic device (PLD), a field programmable logic device (FPLD), discrete logic, etc.). For example, any or all of the example partial mesh VPLS topology 300, the example CE devices 301-306, the example PE devices 311-316, the example ACs 321-326, the example pseudowires 331-342, the first example partial mesh VPLS network 400, the example cliques 402-406, the example ACs 421-423, 424A-B, 425A-B, 426A-B, the second example partial mesh VPLS network 500, the example route reflector 510, the example pseudowires 531-536, the example communication interface 610, the example pseudowires 615, the example topology configuration interface 620, the example configuration management unit 630 and/or the example routing information filter 640 could be implemented by any combination of software, hardware, and/or firmware. Also, some or all of the machine readable instructions represented by the flowchart of FIGS. 7 and 9 may be implemented manually. Further, although the example machine readable instructions are described with reference to the flowcharts illustrated in FIGS. 7 and 9, many other techniques for implementing the example methods and apparatus described herein may alternatively be used. For example, with reference to the flowcharts illustrated in FIGS. 7 and 9, the order of execution of the blocks may be changed, and/or some of the blocks described may be changed, eliminated, combined and/or subdivided into multiple blocks.

Example machine readable instructions 700 that may be executed to implement a partial mesh decomposition procedure to implement a partial mesh VPLS network using a union of full mesh cliques are shown in FIG. 7. For example, the machine readable instructions 700 may be executed by a processor (e.g., such as processor 1012 included in the computer system 1000 described below) to configure a plurality of PE devices (e.g., such as the plurality of PE devices 301-306) to implement a plurality of full mesh cliques (e.g., such as the cliques 402-406) whose union forms a desired partial mesh VPLS network instance (e.g., such as the first example partial mesh VPLS network 400). Without loss of generality, and for ease of discussion, execution of the example machine readable instructions 700 is described with reference to execution of the partial mesh decomposition procedure on the example processor 1012 to implement the first example partial mesh VPLS network 400. Furthermore, the execution of the example machine readable instructions 700 is described with reference to the partial mesh decomposition procedure performing the example sequence of partial mesh decomposition operations illustrated in FIGS. 8A-8E for implementing the first example partial mesh VPLS network 400 based on the desired example partial mesh topology 300.

Turning to FIG. 7, the example machine readable instructions 700 begin execution at block 705 at which the example partial mesh decomposition procedure executing on the example processor 1012 obtains information describing a plurality of nodes (e.g., such as PE devices) and a plurality of connections (e.g., such as pseudowires) to interconnect the nodes according to a desired partial (or full) mesh topology. For example, at block 705 the example partial mesh decomposition procedure may obtain information describing the desired example partial mesh topology 800 of FIG. 8A, which corresponds to the example partial mesh VPLS topology 300 of FIG. 3. In this example, the topology information obtained at block 705 includes routing information describing the nodes 801-806 (e.g., the PE devices 801-806) and the particular topology of connections (e.g., pseudowires) interconnecting the nodes 801-806.

Returning to FIG. 7, control next proceeds to block 710 at which the example partial mesh decomposition procedure determines the degree of each node having remaining connections in the remaining network topology. A degree of a node is equal to the number of connections interconnected with the node. Turning to the example of FIG. 8A, during the first iteration of the example machine readable instructions 700, the remaining network topology corresponds to the example partial mesh topology 800. Therefore, in this example, at block 710 the example partial mesh decomposition procedure determines that the degrees of nodes 801, 802 and 803 are each equal to four (4), the degrees of nodes 804 and 805 are each equal to five (5), and the degree of node 806 is equal to two (2).

Returning to FIG. 7, control next proceeds to block 715 at which the example partial mesh decomposition procedure identifies all nodes having degree equal to one (1). Then, at block 720 the example partial mesh decomposition procedure implements a full mesh clique for each connection interconnecting a node identified at block 715 as having a degree equal to one. After forming any full mesh clique(s) at block 720, control proceeds to block 725 at which the example partial mesh decomposition procedure removes all connections from the remaining network topology that interconnect a node identified at block 715 as having a degree equal to 1 and for which a clique was created at block 720. Additionally, at block 720, for each connection removed from the remaining network topology, the example partial mesh decomposition procedure decrements the degrees of each node previously coupled to the removed connection. Turning to the example of FIG. 8A, during the first iteration of the example machine readable instructions 700, none of the nodes 801-806 is identified as having a degree equal to 1 and, thus, the processing at blocks 715 through 725 is not performed in this example. However, the processing at blocks 715 through 725 is performed during a later iteration of the example machine readable instructions 700 operating on the examples of FIGS. 8C-8D discussed in greater detail below.

Returning to FIG. 7, after the processing at block 725 completes, control proceeds to block 730 at which the example partial mesh decomposition procedure sorts the nodes in descending order of degree. Turning to the example of FIG. 8A, during the first iteration of the example machine readable instructions 700, at block 730 the example partial mesh decomposition procedure sorts the nodes in the following descending order of degree: 804 (degree=5), 805 (degree=5), 801 (degree=4), 802 (degree=4), 803 (degree=4) and 806 (degree=2). Returning to FIG. 7, control next proceeds to block 735 at which the example partial mesh decomposition procedure determines whether all nodes have degree equal to zero. During the first iteration of the example machine readable instructions 700 in the example of FIG. 8A, all nodes have degree>0. Thus, in this example, at block 735 the example partial mesh decomposition procedure determines that all nodes do not have degree equal to zero and, therefore, control proceeds to block 740.

At block 740, the example partial mesh decomposition procedure identifies and implements the largest full mesh clique in the remaining network topology. For example, at block 740 the example partial mesh decomposition procedure may initially start searching for a full mesh clique in the remaining network topology having a rank (e.g., number of nodes) one greater than the largest degree determined by sorting the nodes according to degree at block 730. If a full mesh clique having this rank is not found, the example partial mesh decomposition procedure may then decrement the search rank by one and then search for a full mesh clique having this new lower rank. This process may be reiterated until a full mesh is found. Turning to the example of FIG. 8A, at block 740 the example partial mesh decomposition procedure begins searching for a full mesh clique having a rank (e.g., number of nodes) equal to six (which is one greater than the largest degree (i.e., five which corresponds to nodes 804 or 805) of any node in the remaining network topology 800. A full mesh clique having a rank equal to six does not exist in the remaining network topology 800, so the example partial mesh decomposition procedure then searches for a full mesh clique having a rank equal to five. Such a full mesh clique exists and is indicated by the highlighted full mesh clique 820 in FIG. 8B. Thus, at block 740 the example partial mesh decomposition procedure creates the full mesh clique 820 including nodes 801-805 and the highlighted connections. For example, the partial mesh decomposition procedure may create the full mesh clique 820 by associating a unique VPLS identifier with these connections and associating unique node identifiers for the nodes 801-805 to be used in the VPLS instance corresponding to the full mesh clique 820.

Returning to FIG. 7, control next proceeds to block 745 at which the example partial mesh decomposition procedure removes all of the connections included in the full mesh clique created at block 740 from the current network topology to form a remaining network topology. Turning to the example of FIG. 8B, at block 745 the example partial mesh decomposition procedure removes the connections included in the full mesh clique 820 from the example partial mesh topology 800 to form the remaining network topology 830 illustrated in FIG. 8C.

Returning to FIG. 7, after processing at block 745 completes, control returns to block 710 at which the example partial mesh decomposition procedure again determines the degree of each node having remaining connections in the remaining network topology. Turning to the example of FIG. 8C, at block 710 the example partial mesh decomposition procedure determines that only nodes 804, 805 and 806 have remaining connections in the example remaining network topology 830, with the degrees of nodes 804 and 805 each being equal to one, and the degree of node 806 being equal to two.

Returning to FIG. 7, control next proceeds to block 715 at which the example partial mesh decomposition procedure identifies all nodes having degree equal to one. In the example of FIG. 8C, both nodes 804 and 805 are identified by the example partial mesh decomposition procedure as having degrees equal to one. Next, control proceeds to block 720 at which the example partial mesh decomposition procedure implements a full mesh clique for each connection interconnecting a node identified at block 715 as having a degree equal to one. Turning to the example of FIG. 8C, the example partial mesh decomposition procedure implements a full mesh clique for the connection interconnecting node 804 (a node with degree of one) with node 806, indicated by the highlighted full mesh clique 840 in FIG. 8D. Additionally, the partial mesh decomposition procedure implements another full mesh clique for the connection interconnecting node 805 (a node with degree of one) with node 806, indicated by the highlighted full mesh clique 845 in FIG. 8D.

Returning to FIG. 7, after forming any full mesh clique(s) at block 720, control proceeds to block 725 at which the example partial mesh decomposition procedure removes all connections from the remaining network topology that interconnect a node identified at block 715 as having a degree equal to 1 and for which a clique was created at block 720. Additionally, at block 725, for each connection removed from the remaining network topology, the example partial mesh decomposition procedure decrements the degrees of each node previously coupled to the removed connections. Turning to the example of FIG. 8E, at block 725 the example partial mesh decomposition procedure removes the connections corresponding to the full mesh cliques 840 and 845 created at block 720. Additionally, the example partial mesh decomposition procedure decrements the degrees of the nodes 804-806 interconnected by these removed connections. For example, the degrees of nodes 804 and 805 would each be decremented to a value of zero, and the degree of node 806 would be decremented twice, once for each connection previously coupled to 806 but now removed at block 725, resulting in a value of zero.

Returning to FIG. 7, after the processing at block 725 completes, control proceeds to block 730 at which the example partial mesh decomposition procedure sorts the nodes in descending order of degree. Turning to the example of FIG. 8A, during this point of the second iteration of the example machine readable instructions 700, at block 730 the example partial mesh decomposition procedure determines that all nodes 801-806 have a degree of zero after the connections included in the full mesh cliques 840 and 845 have been removed from the remaining network topology 830. Thus, in this example, at block 735 the example partial mesh decomposition procedure determines that all nodes now have degree equal to zero, and control proceeds to block 750.

At block 750, the example partial mesh decomposition procedure implements the desired partial mesh topology as a union of the determined and implemented full mesh cliques. In an example implementation, the union of the cliques determined by the example partial mesh decomposition procedure is implemented by associating each of the determined cliques with a separate VPLS instance (e.g., separate VPLS and corresponding node identifiers). The combination of the VPLS instances corresponding to the determined cliques then forms the desired example network topology. Because a combination of VPLS instances is used to form the union of cliques, multiple VPLS instances may need to be associated with the ACs interconnecting CE devices with network nodes (e.g., PE device). Execution of the example machine readable instructions 700 then ends.

Figure 8B:
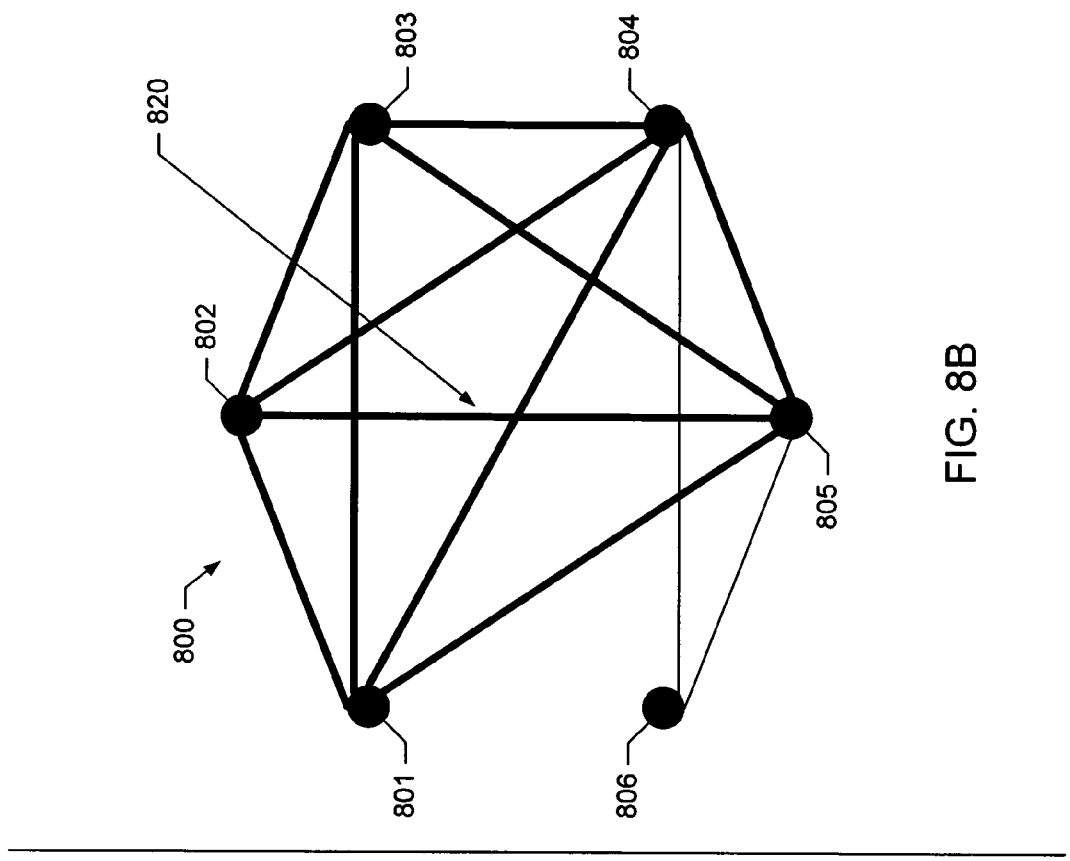
Figure 8A:
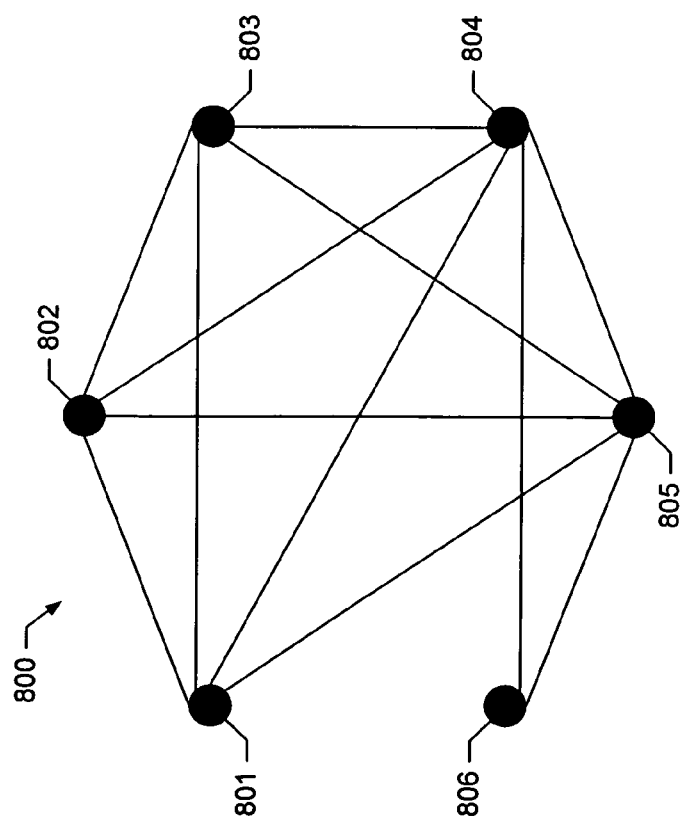
Figure 8E:
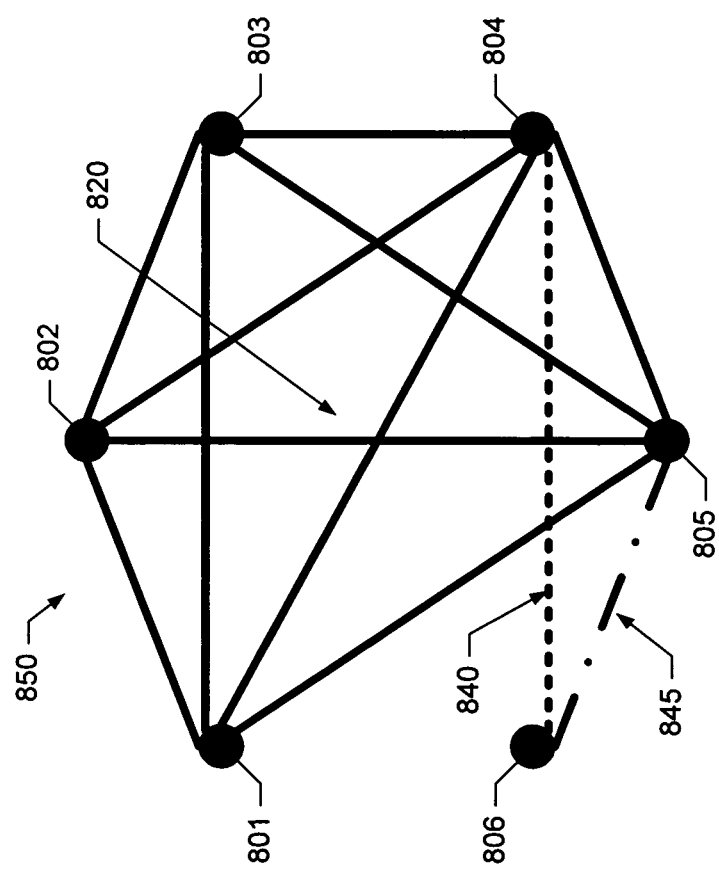

Turning to the example of FIG. 8E, at block 750 the example partial mesh decomposition procedure implements the desired partial mesh topology 850 (which is the same topology as the originally desired example partial mesh topology 800 of FIG. 8A) as a union of the determined and implemented full mesh cliques 820, 840 and 845 as shown. Additionally, because multiple VPLS instances are now associated with the PE devices 804, 805 and 806, multiple VPLS instances may need to be supported by the ACs coupling each of the PE devices 804, 805 and 806 to their corresponding CE devices (not shown).

Example machine readable instructions 900 that may be executed to implement a partial mesh configuration and implementation procedure to implement a partial mesh VPLS network using modified route reflection are shown in FIG. 9. The machine readable instructions 900 may be executed by, for example, a modified route reflector (e.g., such as the example route reflector 510 included in the second example partial mesh VPLS network 500 described above) to configure the modified route reflector to implement a desired partial mesh VPLS network instance (e.g., such as the second example partial mesh VPLS network 500). Without loss of generality, and for ease of discussion, execution of the example machine readable instructions 900 is described with reference to execution by the example route reflector 510 to implement the second example partial mesh VPLS network 500 based on the desired example partial mesh VPLS topology 300 of FIG. 3.

Turning to FIG. 9, the example machine readable instructions 900 implement two phases of operation, namely, a configuration phase 910 and an implementation phase 920. Execution of the example machine readable instructions 900 begins at block 930 in the configuration phase 910 at which the example route reflector 510 obtains information describing a plurality of nodes (e.g., such as PE devices) and a plurality of connections (e.g., such as pseudowires) to interconnect the nodes according to a desired partial (or full) mesh topology. For example, at block 930 the example topology configuration interface 620 included in the example route reflector 510 of FIG. 6 may obtain information describing the nodes and connections included in the desired example partial mesh VPLS topology 300 of FIG. 3.

After the topology description information is obtained at block 930, control proceeds to block 940 at which the example route reflector 510 configures a table (or other appropriate network topology representation) specifying pairs of nodes that are prohibited from being interconnected (i.e., non-adjacent nodes) in the desired partial mesh topology obtained at block 930. For example, at block 940 the configuration management unit 630 included in the example route reflector 510 may use the topology description information obtained by the topology configuration interface 620 at block 930 to create the prohibited topology adjacency table 550 specifying the prohibited adjacent nodes in the desired example partial mesh VPLS topology 300. In an alternative implementation, at block 940 the example route reflector 510 could configure a table specifying the allowed connections (i.e., adjacencies) between pairs of nodes, instead of the prohibited adjacencies, in the desired partial mesh network topology.

After processing at block 940 completes and the configuration phase 910 ends, control proceeds to block 950 of the implementation phase 920 at which the example route reflector 510 filters the information provided by incoming signaling packets (e.g., routing information included in demultiplexor labels) using the table of prohibited connections determined at block 940. For example, at block 950 the routing information filter 640 included in the example route reflector 510 parses (e.g., filters) incoming signaling packets (e.g., such as demultiplexor labels) to obtain the routing information included in the signaling packets, such as, for example, identification information for the source node and destination node of each incoming data packet. The routing information filter 640 then compares the parsed routing information with the topology information specified in the topology adjacency table configured at block 940. If, for example, the comparison indicates that a signaling packet (e.g., demultiplexor label) has a destination PE device and a source PE device that are not adjacent (i.e., not connected) in the specified topology, the routing information filter 640 blocks the incoming signaling packet from being routed (e.g., advertised) out from the routing reflector 510.

After the routing information is filtered according to the table of node adjacencies at block 950, control proceeds to block 960 at which the example route reflector 510 advertises (or routes, etc.) incoming signaling information (e.g., demultiplexor labels) surviving the filtering performed at block 950. For example, at block 960 the routing information filter 640 included in the example route reflector 510 may allow the route reflector 510 to advertise (or route, etc.) incoming signaling packets (e.g., demultiplexor labels) whose source node and destination node are adjacent (e.g., connected) in the network topology specified by the table configured at block 940. Execution of the example machine readable instructions 900 ends after all incoming signaling information has been processed. Alternatively, execution of the implementation phase 920 of the example machine readable instructions 900 may continue indefinitely or until, for example, the route reflector 510 is powered-down, reset, placed in a configuration mode to restart the configuration phase 910, etc.

Figure 10:
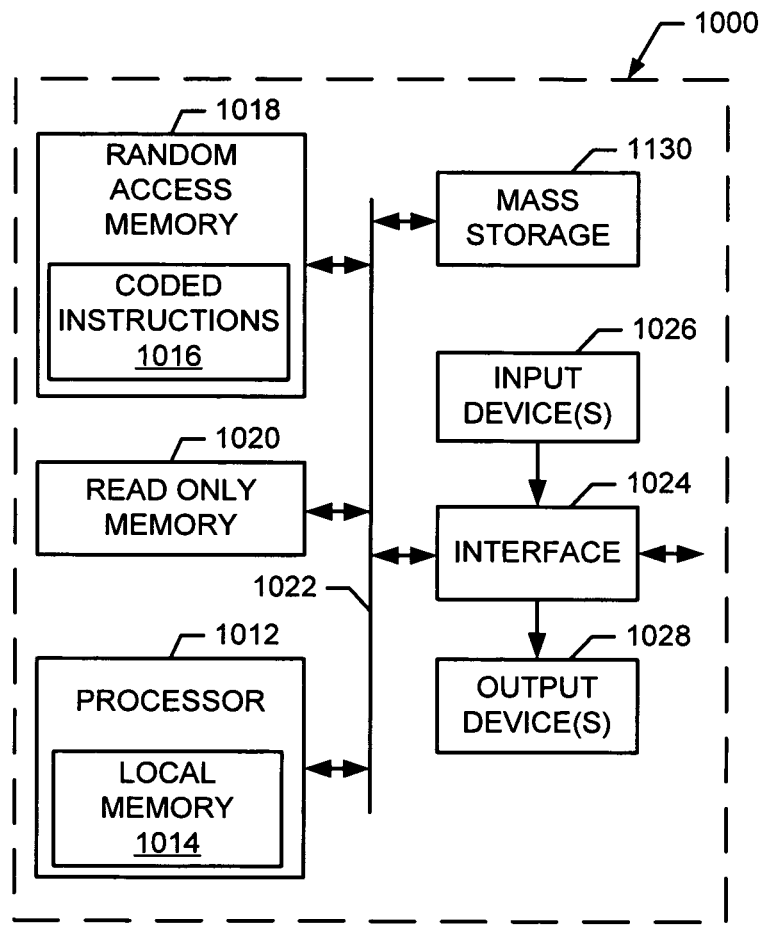
FIG. 10 is a block diagram of an example computer that may execute the example machine readable instructions of FIGS. 7 and/or 9 to implement the example partial mesh VPLS networks illustrated in FIGS. 4 and/or 5.

FIG. 10 is a block diagram of an example computer system 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, the machine readable instructions represented in FIGS. 7 and/or 9. The processor 1012 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system. For example, the topology configuration interface 620 may be implemented by the interface circuit 1024 and one or more of the input devices 1026.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card (e.g., an Ethernet card) to facilitate exchange of data with external computers via a network (e.g., via an Ethernet connection, or any other type of network connection, such as a digital subscriber line (DSL), a telephone line, coaxial cable, a cellular telephone system, etc.).

The system 1000 also includes one or more mass storage devices 1030 for storing software and data. Examples of such mass storage devices 1030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to implement a partial mesh virtual private local area network service network, the method comprising:
   identifying a partial mesh topology of pseudowires for interconnecting a plurality of provider edge devices that are to implement the partial mesh virtual private local area network service network;
   electronically decomposing the partial mesh topology into cliques of pseudowires, a union of the cliques of pseudowires implementing the partial mesh topology and being carried by a full mesh of outer tunnels interconnecting the plurality of provider edge devices, each clique comprising a respective full mesh topology of pseudowires for interconnecting a respective subset of the plurality of provider edge devices, each clique having no pseudowire in more than one of the cliques, the cliques including a first clique that is a largest clique in the partial mesh topology, the cliques also including a second clique that is a largest clique in a topology formed by removing the first clique from the partial mesh topology; and
   interconnecting a customer edge device to a first provider edge device included in the first clique and the second clique using first and second attachment circuits, the first attachment circuit associated with the first clique by a first demultiplexor label, the second attachment circuit associated with the second clique by a second demultiplexor label, both the first and second attachment circuits to carry first data sent from the customer edge device to the first provider edge device, the first data to be further routed through the partial mesh virtual private local area network service network by either the first clique or the second clique based on a destination of the first data, wherein a rank of the first clique corresponds to a number of provider edge devices included in the first clique, and decomposing the partial mesh topology comprises:
   determining respective degrees for respective ones of the provider edge devices, a degree for a respective one of the provider edge devices corresponding to a number of pseudowires interconnecting with the respective one of the provider edge devices in the partial mesh topology;
   determining a largest degree among the respective degrees for the respective ones of the provider edge devices;
   performing a first search for the first clique by (1) setting search rank to be one greater than the largest degree and (2) searching for any clique in the partial mesh topology having a respective rank equal to the search rank; and
   if the first search is unsuccessful, iteratively reducing the search rank and performing a subsequent search until the first clique is found.

2. The method as defined in claim 1 wherein each pseudowire of the partial mesh topology corresponds to a pseudowire interconnecting two provider edge devices.

3. The method as defined in claim 1 wherein at least one pseudowire of the partial mesh topology is established based on at least one of a label distribution protocol or a border gateway protocol.

4. The method as defined in claim 1 wherein decomposing the partial mesh topology comprises including each pseudowire in only one clique.

5. The method as defined in claim 1 further comprising implementing the union of the cliques by associating a unique virtual private local area network service identifier with each of the cliques.

6. The method as defined in claim 1 wherein the partial mesh virtual private local area network service network is to be implemented by a plurality of attachment circuits including the first and second attachment circuits, and each attachment circuit is to interconnect a customer edge device with a respective one of the plurality of provider edge devices.

7. The method as defined in claim 6 further comprising implementing the union of the cliques by associating at least two cliques with at least one of the plurality of attachment circuits.

8. The method as defined in claim 1 wherein the first clique corresponds to a first subset of the pseudowires included in the partial mesh topology, and the method further comprises:
forming a topology of remaining pseudowires by removing the first subset of pseudowires from the partial mesh topology; and
creating the second clique to correspond to a second subset of the plurality of provider edge devices forming a largest full mesh topology in the topology of remaining pseudowires.

9. The method as defined in claim 1 wherein the cliques comprise a set of cliques having respective ranks equal to two and at least one higher ranking clique, and decomposing the partial mesh topology into the cliques comprises:
creating a separate rank two clique for each connection associated with each provider edge device whose degree equals one; and
determining the first clique from a topology of remaining pseudowires formed by removing each pseudowire associated with each provider edge device whose degree equals one from the partial mesh topology of pseudowire.

10. A tangible machine readable memory storing machine readable instructions which, when executed, cause a machine to perform operations comprising:
identifying a partial mesh topology of pseudowires for interconnecting a plurality of provider edge devices that are to implement a partial mesh virtual private local area network service network;
decomposing the partial mesh topology into cliques of pseudowires, a union of the cliques of pseudowires implementing the partial mesh topology and being carried by a full mesh of outer tunnels interconnecting the plurality of provider edge devices, each clique comprising a respective full mesh topology of pseudowires for interconnecting a respective subset of the plurality of provider edge devices, each clique having no pseudowire in more than one of the cliques, the cliques including a first clique that is a largest clique in the partial mesh topology, the cliques also including a second clique that is a largest clique in a topology formed by removing the first clique from the partial mesh topology; and
interconnecting a customer edge device to a first provider edge device included in the first clique and the second clique using first and second attachment circuits, the first attachment circuit associated with the first clique by a first demultiplexor label, the second attachment circuit associated with the second clique by a second demultiplexor label, both the first and second attachment circuits to carry first data sent from the customer edge device to the first provider edge device, the first data to be further routed through the partial mesh virtual private local area network service network by either the first clique or the second clique based on a destination of the first data, wherein a rank of the first clique corresponds to a number of provider edge devices included in the first clique, and decomposing the partial mesh topology comprises:
determining respective degrees for respective ones of the provider edge devices, a degree for a respective one of the provider edge devices corresponding to a number of pseudowires interconnecting with the respective one of the provider edge devices in the partial mesh topology;
determining a largest degree among the respective degrees for the respective ones of the provider edge devices;
performing a first search for the first clique by (1) setting search rank to be one greater than the largest degree and (2) searching for any clique in the partial mesh topology having a respective rank equal to the search rank; and
if the first search is unsuccessful, iteratively reducing the search rank and performing a subsequent search until the first clique is found.

11. The tangible machine readable memory as defined in claim 10 wherein each pseudowire of the partial mesh topology corresponds to a pseudowire interconnecting two provider edge devices.

12. The tangible machine readable memory as defined in claim 10 wherein at least one pseudowire of the partial mesh topology is established based on at least one of a label distribution protocol or a border gateway protocol.

13. The tangible machine readable memory as defined in claim 10 wherein decomposing the partial mesh topology comprises including each pseudowire in only one clique.

14. The tangible machine readable memory as defined in claim 10 wherein the operations further comprise implementing the union of the cliques by associating a unique virtual private local area network service identifier with each of the cliques.

15. The tangible machine readable memory as defined in claim 10 wherein the partial mesh virtual private local area network service network is to be implemented by a plurality of attachment circuits including the first and second attachment circuits, and each attachment circuit is to interconnect a customer edge device with a respective one of the plurality of provider edge devices.

16. The tangible machine readable memory as defined in claim 15 wherein the operations further comprise implementing the union of the cliques by associating at least two cliques with at least one of the plurality of attachment circuits.

* * * * *